(12) United States Patent
Alidedeoglu et al.

(10) Patent No.: US 9,944,773 B2
(45) Date of Patent: Apr. 17, 2018

(54) MODIFIED ENDCAPPED POLY(ALKYLENE TEREPHTHALATE) PREPARED BY EMPLOYING AN IN SITU TITANIUM-CONTAINING CATALYST AND COMPOSITIONS DERIVED THEREFROM

(71) Applicant: SABIC Global Technologies B.V., Bergen op Zoom (NL)

(72) Inventors: Husnu Alp Alidedeoglu, Mt. Vernon, IN (US); Tukaram Gunale, Bangalore (IN); Ganesh Kannan, Sugarland, TX (US); Manojkumar Chellamuthu, Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 10 days.

(21) Appl. No.: 15/114,226

(22) PCT Filed: Jan. 26, 2015

(86) PCT No.: PCT/US2015/012817
§ 371 (c)(1),
(2) Date: Jul. 26, 2016

(87) PCT Pub. No.: WO2015/116510
PCT Pub. Date: Aug. 6, 2015

(65) Prior Publication Data
US 2016/0369088 A1 Dec. 22, 2016

Related U.S. Application Data

(60) Provisional application No. 61/932,703, filed on Jan. 28, 2014.

(51) Int. Cl.
| | | |
|---|---|---|
| C08K 7/14 | (2006.01) |
| C08L 67/02 | (2006.01) |
| C08J 11/04 | (2006.01) |
| C08J 11/26 | (2006.01) |
| C08J 11/28 | (2006.01) |
| C08G 63/183 | (2006.01) |
| C08G 63/50 | (2006.01) |
| C08G 63/78 | (2006.01) |
| C08G 63/85 | (2006.01) |
| C08G 63/91 | (2006.01) |

(52) U.S. Cl.
CPC .......... *C08K 7/14* (2013.01); *C08G 63/183* (2013.01); *C08G 63/50* (2013.01); *C08G 63/78* (2013.01); *C08G 63/85* (2013.01); *C08G 63/916* (2013.01); *C08J 11/26* (2013.01); *C08J 11/28* (2013.01); *C08L 67/02* (2013.01); *C08J 2367/02* (2013.01)

(58) Field of Classification Search
CPC ........ C08J 11/04; C08L 67/02; C08G 63/916; C08K 7/14
USPC .............................. 528/308.1, 272, 274, 287
See application file for complete search history.

(56) References Cited

U.S. PATENT DOCUMENTS

| | | |
|---|---|---|
| 2,012,267 A | 8/1929 | Carothers |
| 4,328,059 A | 5/1982 | Horlbeck et al. |
| 6,020,393 A | 2/2000 | Khemani |
| 6,303,738 B1 | 10/2001 | Putzig et al. |
| 7,129,301 B2 | 10/2006 | Wu et al. |
| 7,799,836 B2 | 9/2010 | Agarwal et al. |
| 2005/0113534 A1 | 5/2005 | Agarwal et al. |
| 2013/0079458 A1* | 3/2013 | Alidedeoglu ............ C08F 4/76 524/537 |

FOREIGN PATENT DOCUMENTS

| | | |
|---|---|---|
| JP | 60147430 A | 8/1985 |
| WO | 2013033285 A1 | 3/2013 |

\* cited by examiner

*Primary Examiner* — Kelechi Egwim
(74) *Attorney, Agent, or Firm* — Cantor Colburn LLP

(57) ABSTRACT

Disclosed is a modified endcapped polyalkylene terephthalate such as modified endcapped polybutylene terephthalate, as well as processes for making the modified endcapped polybutylene terephthalate and compositions and articles derived therefrom.

19 Claims, 8 Drawing Sheets

MODIFIED ENDCAPPED POLY(ALKYLENE TEREPHTHALATE) PREPARED BY EMPLOYING AN IN SITU TITANIUM-CONTAINING CATALYST AND COMPOSITIONS DERIVED THEREFROM

CROSS-REFERENCE TO RELATED APPLICATIONS

This application is a National Stage application of PCT/US2015/012817, filed Jan. 26, 2015, which claims the benefit of U.S. Provisional Application No. 61/932,703, filed Jan. 28, 2014, both of which are incorporated by reference herein in their entirety.

TECHNICAL FIELD OF THE INVENTION

Disclosed is an endcapped polyalkylene terephthalate such as an endcapped polybutylene terephthalate, as well as processes for making the endcapped polybutylene terephthalate and compositions and articles derived therefrom.

BACKGROUND OF THE INVENTION

Polybutylene terephthalate (PBT) is a well-known semi-crystalline resin that has desirable properties. Compared to amorphous resins such as ABS, polycarbonate, and polystyrene, a crystalline resin like PBT will show much better solvent resistance, higher strength, and higher stiffness due to the presence of crystalline spherulites in the resin. PBT resin is used in many applications where its solvent resistance, strength, lubricity, and rigidity are needed, commonly in durable goods that are formed by injection molding, such as in electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. PBT is very widely used to form electrical connectors. Through its many blended products, PBT can be tailored to meet a wide variety of end uses.

U.S. Pat. Nos. 7,129,301; 6,020,393; 4,328,059, and United States Publication No. 2005/0113534 disclose various catalysts for the polymerization of polyesters. Tetraalkyl titanates have been most commonly used as catalysts for PBT polymerization. The various titanates can include tetraisopropyl titanate, tetrabutyl titanate, and tetra(2-ethylhexyl) titanate. JP 60147430 discloses a method of producing polyester by esterifying terephthalic acid, adipic acid and 1,4-butanediol in the presence of titanium compound and a pentavalent phosphorus compound. U.S. Pat. No. 6,303,738 B1 discloses a process for producing copolyester containing adipic acid in the presence of TYZOR IAM (available from DuPont), which was prepared through the combination of TPT (tetraisopropyl titanate) and a mixture of butyl phosphate and dibutyl phosphate. International Patent Application Publication No. WO 2013/033285 relates to an aliphatic-aromatic copolyester of poly(butylene-co-adipate terephthalate) from polyethylene terephthalate, compositions and articles containing the copolyester, a process for preparing the copolyester, and an in situ phosphorus-containing titanium-based catalyst (see abstract, [0001]).

At the end of the polymerization process, the catalyst is typically not quenched (deactivated) in the resin composition. Unfortunately, an active catalyst in the resin composition can sometimes lead to undesirable reactions in subsequent processing of the polyalkylene terephthalate to make blends or compositions. On exposure to high temperature and humidity, blends and compositions containing the modified polyalkylene terephthalate can exhibit hydrolytic degradation, especially under caustic conditions. Another problem associated with some blends is transesterification, which can lead to loss of mechanical properties.

Catalyst quenchers such as phosphoric acid can be added to thermoplastic compositions to prevent such transesterification, but they can also promote degradation of polymer chains and contribute to a decrease in polymer molecular weight and greater hydrolytic instability. The use of phosphite stabilizers is less satisfactory because of the tendency for phosphites to be unstable to both hydrolysis and oxidation. Although the use of chain extenders can help to counterbalance the effect of the quencher, it is desirable to eliminate the use of either quencher or chain extender additives as a necessity.

Insufficient hydrostability of modified polyalkylene terephthalate can lead to chain cleavage, the extent of which depends on the exact conditions of exposure to water or humidity. Temperature, time of exposure, and pH are all important. Both acids and bases can catalyze ester hydrolysis. Decomposition of modified polyalkylene terephthalate can be accelerated in aqueous acid or base, or if the polymer matrix of modified polyalkylene terephthalate contains free acid or base additives. Since a reaction product of polyalkylene terephthalate hydrolysis is itself a carboxylic acid, the hydrolytic decomposition of a polyalkylene terephthalate such as PBT is autocatalytic, as depicted in Scheme 1.

Scheme 1

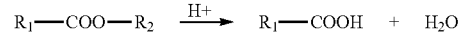

Thus, there is a need for polyalkylene terephthalates with improved properties including hydrostability as well as polymer compositions and articles derived therefrom. There is a further need for new and improved catalysts or processes for the production of modified polyalkylene terephthalates that are effective in polymerization, but that do not adversely impact the properties of the resulting modified polyalkylene terephthalate. There is also a need to eliminate the necessity of using either quencher or chain extender additives in preparing modified polyalkylene terephthalates.

SUMMARY OF THE INVENTION

These and other needs are met by the present invention which is directed to endcapped polyalkylene terephthalate with improved hydrostability and increased crystallization rate. The endcapped polyalkylene terephthalate can be prepared from virgin feedstocks or from recycled polyethylene terephthalate via methods available to the skilled artisan using an endcapping agent in the presence of a novel titanium-containing catalyst complex. The titanium containing catalyst is the product of a tetraisopropyl titanate with a complexing agent selected from the group consisting of phosphorus-containing compounds, nitrogen-containing compounds, boron-containing compounds, and combinations thereof.

In one aspect, the invention is directed to an endcapped polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and wherein the endcapped polyalkylene terephthalate contains 0.01 to 5 weight percent of an endcapping agent which is a primary monoalcohol having 10 carbon atoms or more and a boiling point of at least 232° C. at atmospheric pressure.

The invention is also directed to processes for making the endcapped polyalkylene terephthalate, as well as compositions and articles derived therefrom.

In another aspect, the invention is directed to a thermoplastic composition with improved hydrostability and increased crystallization rate, comprising:

50 to 99.99 percent by weight of a endcapped polyalkylene terephthalate containing 50 to 300 ppm of tetra($C_1$-$C_8$ alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and 0 to 60 percent by weight of a reinforcing filler; and wherein the endcapped polyalkylene terephthalate contains 0.01 to 5 weight percent of an endcapping agent which is a primary monoalcohol having 10 carbon atoms or more and a boiling point of at least 232° C. at atmospheric pressure;

wherein all weight percents are based on the total weight of the composition; and wherein no quencher for the catalyst complex is added to the compounded thermoplastic composition.

In addition to significantly enhancing the hydrostability of the thermoplastic composition, the presence of an endcapping agent was also surprisingly found to increase the crystallization rate of the material and to improve its mechanical performance, particularly with respect to impact and tensile strength.

DETAILED DESCRIPTION OF THE INVENTION

Figure 1A:
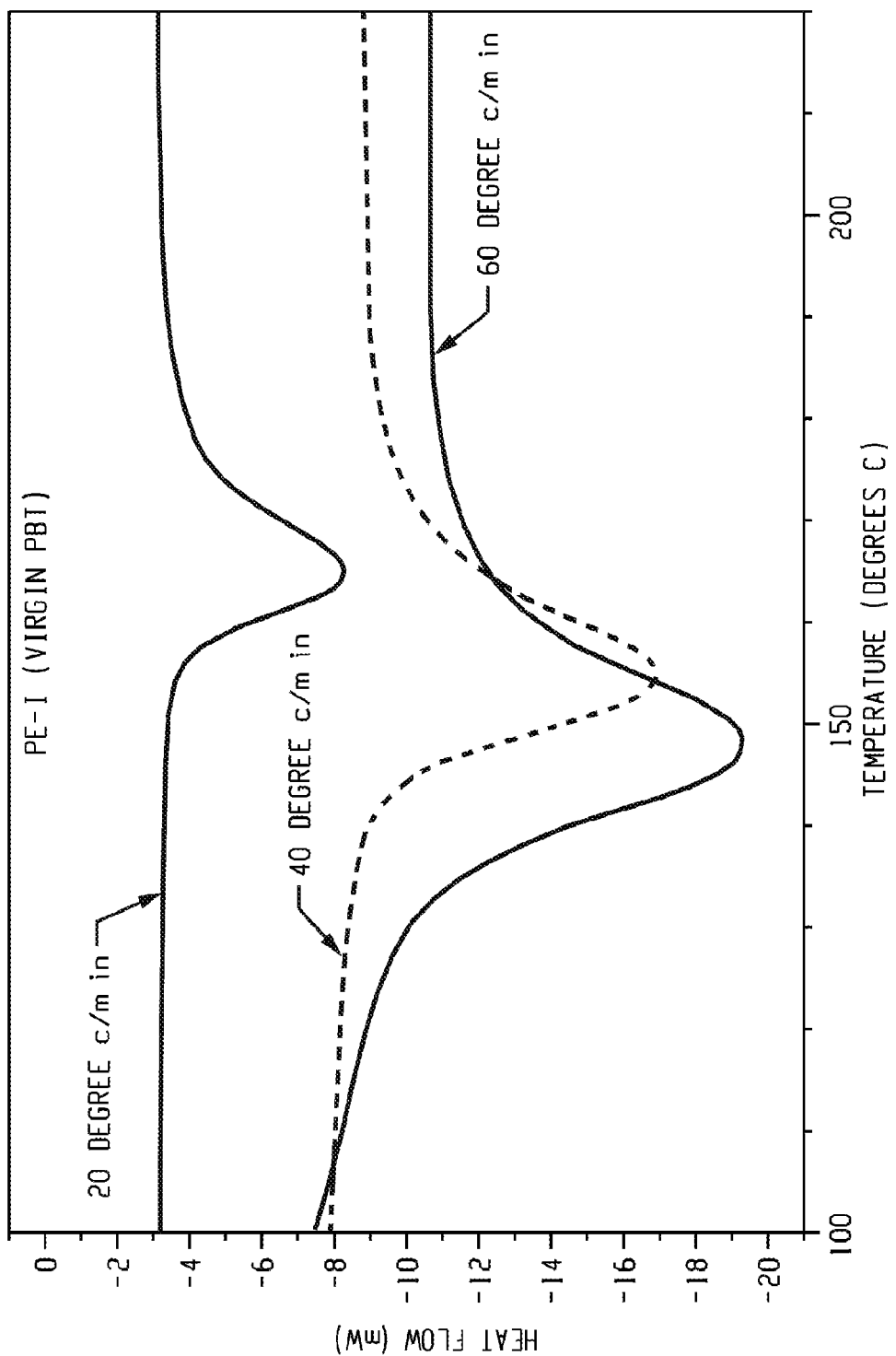
FIGS. 1A and 1B show the representative plots of nonisothermal crystallization exotherms of PE-I, and EX3 as a function of cooling rates (20, 40, 60° C./min).

As used herein, the singular forms "a," "an," and "the" include plural referents. The term "combination" is inclusive of blends, mixtures, alloys, reaction products, and the like.

Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" (IPA), ("diacid groups") or "ethylene glycol group" (EG), "butanediol group," and "diethylene glycol group" (DEG, diol groups), being used to indicate, for example, the weight percent (percent by weight) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (—O($C_2H_4$)—).

The term "recycle" or "recycled" as used herein refers to any component that has been manufactured and either used or intended for scrap. Thus, a recycled polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

"Modified polyalkylene terephthalate," including "modified PBT," means a polyalkylene terephthalate made from recycled or scrap PET. The polymer is modified in that it contains at least one residue derived from the polyethylene terephthalate component used in the process.

"Endcapped Modified polyalkylene terephthalate," including "endcapped modified polybutylene terephthalate (PBT)" means an endcapped polyalkylene terephthalate wherein the polyalkylene terephthalate is made from recycled or scrap PET. The polymer is modified in that it contains at least one residue derived from the polyethylene terephthalate component used in the process. The term "contain" as it refers to a modified polyalkylene terephthalate containing the catalyst described herein, means that the catalyst, which can be synthesized in-situ, is present during depolymerization of the polyethylene terephthalate starting material, ester interchange with an alkylene diol, and subsequent polymerization of the modified terephthalate, so that the catalyst is present in the isolated modified polyalkylene terephthalate product.

Parts per million (ppm) as relating, for instance, to ppm of tetra($C_1$-$C_8$alkyl) titanate and ppm of a phosphorous containing compound in the modified polyalkylene terephthalate or compositions derived therefrom, as reported herein are based on the total amount of titanium contained in the modified polyalkylene terephthalate.

The phrase "wherein essentially no quencher for the catalyst complex is added to the compounded thermoplastic composition" means that no quencher is intentionally added to the thermoplastic composition.

Unless otherwise specified, amounts are indicated in percents by weight based on the total weight of the composition.

Endcapping Agent

In an embodiment, the endcapping agent used is a primary monoalcohol having 10 carbon atoms or more and a boiling point of at least 232° C. at atmospheric pressure. More particularly, the endcapping agent is selected from the group consisting of 1-decanol, 1-undecanol, 1-dodecanol, 1-tridecanol, 1-tetradecanol, 1-dentadecanol, 1 hexadecanol, 1-heptadecanol, 1-octadecanol, 1-nonadecanol, 1-eicosanol, 1-heneicosanol, 1-docosanol, 1-tetracosanol, 1-hexacosanol, 1-heptacosanol, 1-octacosanol, 1-nonacosanol. 1-triacontanol, 1-dotriacontanol, and 1-tetratriacontanol.

In another embodiment, the endcapping agent is selected from the group consisting of 1-decanol, 1-undecanol, 1-dodecanol, and 1-tridecanol. More particularly, the endcapping agent is 1-dodecanol. Preferably, 0.01 to 5 weight percent of the endcapping agent is present in the composition. More preferably, 0.05 to 2.5 weight percent of the endcapping agent is present in the composition.

Endcapped Polyalkylene Terephthalate and Process for Making

Endcapped polyalkylene terephthalate such as endcapped PBT can be prepared from virgin feedstocks or from recycled PET. Endcapped polyalkylene terephthalate can be prepared from virgin feedstocks by reacting an alkylene diol such as 1,4-butanediol, with terephthalic acid or dimethyl terephthalate, in the presence of an endcapping agent and a catalyst complex. Alternatively, endcapped polyalkylene terephthalate can be prepared from recycled materials such as recycled PET by reacting recycled PET with butanediol in the presence of an endcapping agent and a catalyst complex.

Catalyst Complex

The catalyst complex comprises the reaction product of a tetra($C_1$-$C_8$ alkyl) titanate such as tetraisopropyl titanate and a reactant selected from:

(1) phosphorus-containing compounds, at a molar ratio of the phosphorus-containing compound:titanate from 0.05:1 to less than or equal to 1.2:1, specifically 0.2:1 to 1.2:1, more specifically 0.3:1 to 1.2:1, most specifically 0.5:1 to 1.2:1, (2) nitrogen-containing compounds, at a molar ratio of the nitrogen-containing compound:titanate from 0.05:1 to less than or equal to 1.2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 1.2:1, specifically 0.2:1 to 1.2:1, more specifically 0.3:1 to 1.2:1, most specifically 0.5:1 to 1.2:1, and (4) combinations thereof.

Phosphorus-containing compounds include phosphoric acid, poly(phosphoric acid), phosphorous acid, monoalkyl phosphates such as monobutyl phosphate, dialkyl phosphates dibutyl phosphate, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

In regard to these complexing agents, alkyl groups specifically can be $C_1$ to $C_8$, specifically $C_2$ to $C_6$ alkyl groups, more specifically $C_3$ to $C_5$ alkyl groups.

In one embodiment, the titanium-containing catalyst comprises the reaction product of tetra($C_1$-$C_8$ alkyl) titanate, specifically tetraisopropyl titanate, and a phosphorous-containing compound, specifically phosphoric acid, at a molar ratio of the phosphorous-containing compound:tetra($C_1$-$C_8$ alkyl) titanate, specifically at a molar ratio of phosphorous acid:tetraisopropyl titanate from more than 0.2:1 to 0.9:1 and more specifically at a molar ratio of 0.6:1 to 0.9:1.

The polymerization occurs in the presence of a catalyst complex formed by reaction of a tetra($C_1$-$C_8$ alkyl) titanate such as tetraisopropyl titanate and a complexing agent selected from phosphorus-containing compounds, nitrogen-containing compounds, boron-containing compounds, and combinations thereof. The catalyst can be synthesized in situ, prior to depolymerisation of the polyethylene terephthalate, by adding the components of the catalyst to a solution comprising alkylene diol used in the process. At least 90 mol %, specifically at least 95 mol %, more specifically at least 98 mol % of the diacid groups in the modified polyalkylene terephthalate are terephthalic acid groups.

The catalyst is formed in situ by combining a tetra($C_1$-$C_8$ alkyl) titanate such as tetraisopropyl titanate with a complexing agent such as phosphoric acid, and an alkylene diol, prior to addition of the polyethylene terephthalate starting material. The catalyst solution can be heated to an elevated first temperature.

In another embodiment, the tetra($C_1$-$C_8$ alkyl) titanate is tetraisopropyl titanate and the phosphorous containing compound is phosphoric acid.

By way of illustration, a titanium-containing catalyst can be made in accordance with the present process by reacting in situ a tetra($C_1$-$C_8$ alkyl) titanate such as tetraisopropyl titanate with a phosphorous-containing compound such as phosphoric acid, as shown in Scheme 2.

Scheme 2

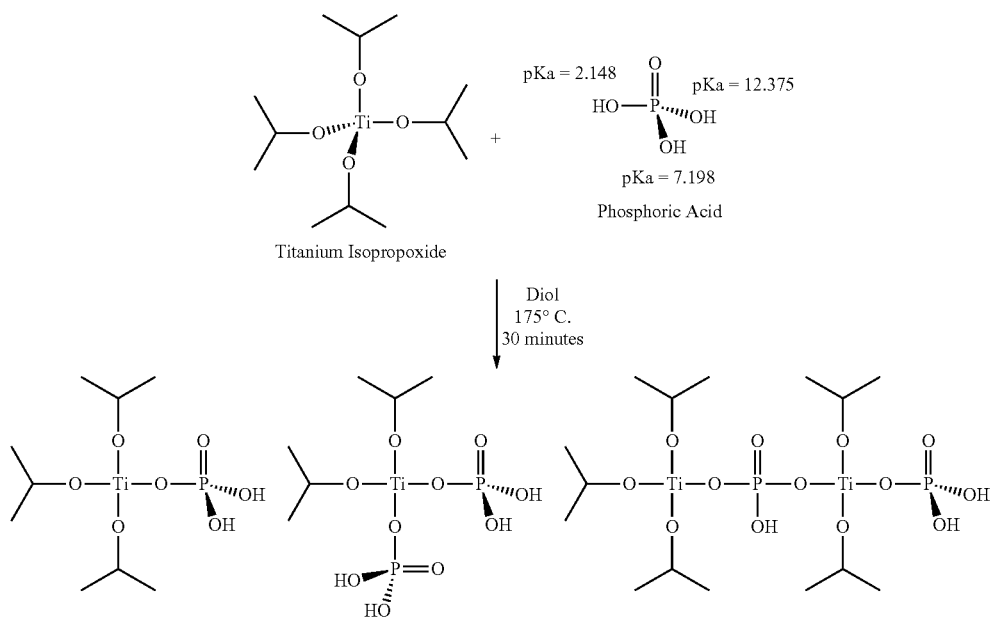

The in-situ reaction between phosphoric acid and tetraisopropyl titanate in diol solvent (for example, butanediol) can achieve complete conversion in the reaction between the most acidic hydroxyl group of the phosphoric acid and tetraisopropyl titanate. Without wishing to be bound by theory, it is believed that once all strongly acidic hydroxyl groups are consumed, polymerization can be conducted without inhibition. After the catalyst preparation, the catalyst complexes and the polyethylene terephthalate can be introduced into a reactor and the reaction temperature can be increased, for example to 220° C., to complete depolymerization and ester interchange, followed by polymerization, for example at 250° C.

As described herein, the resulting endcapped polyalkylene terephthalate containing 50 to 300 ppm of tetra($C_1$-$C_8$ alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and wherein the endcapped polyalkylene terephthalate contains 0.01 to 5 weight percent of an endcapping agent which is a primary monoalcohol having 10 carbon atoms or more and a boiling point of at least 232° C. at atmospheric pressure.

Endcapped PBT Made from Virgin Feed Stocks

Preparation of an endcapped polyalkylene terephthalate, specifically PBT, by melt-process polycondensation (batch processing) is available to the skilled artisan. Conventional polycondensation procedures are described, for example, in U.S. Pat. No. 2,012,267. Such reactions are typically operated at temperatures from 150° C. to 300° C. in the presence of a catalyst complex as described herein. A branched polyalkylene terephthalate can be prepared in which a branching agent, for example, a glycol having three or more hydroxyl groups or a trifunctional or multifunctional carboxylic acid has been incorporated.

Conventional processes are known by which a poly(1,4-butylene terephthalate) or "PBT" resin can be obtained by polymerizing a glycol component at least 90 mol %, specifically at least 95 mol %, which consists of tetramethylene glycol and an acid or ester component at least 90 mol %, specifically at least 95 mol %, which consists of terephthalic acid. The present process can be used in cooperation with, or adapted to, methods (or elements of methods) available in the prior art, as will be appreciated by one of ordinary skill in the art.

As stated above, the present process of preparing an endcapped polyalkylene terephthalate can be by melt polycondensation comprising reacting an alkylene diol and a dicarboxy compound in the presence of an endcapping agent and a catalyst complex. The dicarboxy compound is selected from the group consisting of an aromatic dicarboxylic acid, an aromatic dicarboxylic ($C_1$-$C_3$)alkyl ester, and combinations thereof. In the process, ester interchange and polymerization occurs in the presence of the endcapping agent and a catalyst complex as described above. As indicated previously, the catalyst complex is formed in situ by reaction of a tetra($C_1$-$C_8$ alkyl) such as titanate tetraisopropyl titanate and a compound selected from phosphorus-containing compounds, nitrogen-containing compounds, boron-containing compounds, and combinations thereof.

In particular, the present process comprises forming the catalyst in-situ by combining the tetra($C_1$-$C_8$ alkyl) titanate, complexing agent, and alkylene diol (prior to introduction of the aromatic dicarboxy compound) to form a first mixture, wherein the first mixture is subjected to heat at an elevated first temperature.

The aromatic dicarboxy compound and endcapping agent can then be subsequently introduced, optionally with additional alkylene diol, into the first mixture to form a second mixture, which can be subjected to heat to obtain ester interchange at an elevated second temperature, specifically at a temperature that is higher than the first temperature. In one embodiment, the ester interchange is carried out until the production of methanol volatiles substantially ceases.

Polymerization can be initiated and carried out under vacuum, after substantial completion of the ester interchange, by further increasing the temperature to a third temperature higher than the second temperature. In particular, the second mixture can be subjected to vacuum, optionally with distillation, at a pressure of less than 2 Torr and a temperature of 220° C. to 270° C., to form molten polyalkylene terephthalate.

Endcapped Modified PBT (PBT Made from Recycled PET)

In the preparation of endcapped polybutylene terephthalate prepared from recycled polyethylene terephathalate (endcapped modified PBT), the polyethylene terephthalate component can be reacted with 1,4-butane diol and an endcapping agent under inert atmosphere in the presence of the above-described catalyst. The conditions are sufficient to depolymerize the polyethylene terephthalate component into a molten mixture containing oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, and/or the like. Polyester moieties and the 1,4-butane diol can be combined in the molten phase under agitation, and the 1,4-butane diol can be continuously refluxed back into the reactor during depolymerization. In one embodiment, 1,4-butane diol is refluxed back into the reactor during depolymerization while excess butanediol, ethylene glycol and tetrahydrofuran are removed during or after depolymerization.

The polyethylene terephthalate component and the 1,4-butane diol component, along with the endcapping agent can be combined under atmospheric pressure. In another embodiment, however, it is possible to use pressures that are higher than atmospheric pressures. For instance, in one embodiment, the pressure under which the polyethylene terephthalate component and the 1,4-butane diol are subjected is 2 atmospheres or higher.

The temperature at which the polyethylene terephthalate component and the 1,4-butane diol component along with the endcapping agent are combined and reacted is sufficient to promote depolymerization of the polyethylene terephthalate component into polyethylene terephthalate and polybutylene terephthalate oligomers, 1,4-butane diol, and ethylene glycol. The 1,4-butane diol is generally used in excess relative to the amount of polyethylene terephthalate, for example recycled PET scrap. In one embodiment, 1,4-butane diol is used in a molar excess amount ranging from 2 to 20 mol %.

The duration of the time in which recycled PET reacts with 1,4-butane diol in the presence of the endcapping agent can vary, depending on various factors, such as available equipment, production needs, desired final properties, and the like. In one embodiment, the depolymerization is carried out for at least 30 minutes. In another embodiment, it is carried out for about 2 to 5 hours.

Once a molten mixture forms, the molten mixture can be placed in subatmospheric pressure conditions at a suitable temperature for a period of time that is sufficiently long for the molten mixture to polymerize into a PET-derived modified endcapped PBT polymer.

The subatmospheric conditions can include a pressure of less than 2 Torr, specifically less than 1 Torr. Advantageously, the molten mixture can be placed under subatmospheric conditions without isolation and dissolution of any material from the molten mixture. The temperature at which the molten mixture is placed under subatmospheric conditions is sufficiently high to promote polymerization of the polyethylene terephthalate and polybutylene terephthalate oligomers, 1,4-butane diol, and ethylene glycol to the endcapped modified PBT ("elevated temperature"). Generally, the temperature is at least 220° C. In one embodiment, the temperature ranges from 220° C. to 275° C., specifically 240° C. to 270° C.

During the time when the molten mixture is placed under subatmospheric conditions and the temperature is increased, excess butanediol, ethylene glycol and THF can be removed from the reactor and oligomers allowed to build up molecular weight. Agitation can be continuously provided to facilitate the removal of the low boiling components. After sufficient molecular weight is obtained, the molten endcapped PBT polymer can be dropped from the reactor, cooled, stranded and chopped into pellets.

The duration of polymerization, discussed above (in which the molten mixture polymerizes from polyethylene terephthalate and polybutylene terephthalate oligomers, 1,4-butane diol, and ethylene glycol) can vary, depending on factors such as equipment available, production needs, desired final properties, and the like. In one embodiment, polymerization is carried out for at least two hours. In another embodiment, the step is carried out for at least 30 minutes, specifically from 2 to 5 hours.

The process for making endcapped modified PBT component can include reducing the amount of THF produced during the process by adding to the reactor, during polymerization, a basic compound, containing an alkali metal, or an epoxide. Such methods are disclosed in co-assigned U.S. Pat. Nos. 8,138,233 and 7,799,836, both hereby incorporated by reference in their entirety.

The process for making the endcapped modified PBT may contain an additional stage in which the PBT formed from the molten mixture is subjected to solid-state polymerization (SSP). In one embodiment, polymerization of the molten depolymerized mixture is carried out under vacuum by subjecting the depolymerized mixture to vacuum under heat, optionally with distillation, at a pressure of less than 2 Torr and a temperature of 220° C. to 270° C. until an intrinsic viscosity of 0.4 to 0.6 is obtained and then initiating solid state polymerization at a temperature of 200° C. to 220° C. solid-state polymerization generally involves subjecting the endcapped modified PBT formed from the molten mixture to an inert atmosphere and heating to a temperature for a sufficient period of time to build the molecular weight of the endcapped modified PBT. Generally, the temperature to which the PBT is heated is below the melting point of the modified endcapped modified PBT, e.g., from 5° C. to 60° C. below the melting point of the endcapped modified PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the endcapped modified PBT to a suitable molecular weight. Such tumultuous conditions may be created by subjecting the endcapped modified PBT to tumbling, the pumping of inert gas into the system to promote fluidization of polymer particle, e.g., pellets, chips, flakes, powder and the like. The solid-state polymerization can be carried out at atmospheric pressure and/or under reduced pressure, e.g., from 1 atmosphere to 1 mbar.

In still another embodiment, the invention includes a process for making endcapped PTT (polytrimethylene terephthalate) that involves reacting a polyethylene terephthalate component with a 1,3-propanediol at a pressure that is at least atmospheric pressure in the presence of a catalyst complex at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol and/or combinations thereof. The polyethylene terephthalate component and the 1,3-propanediol can be combined in the molten phase under agitation and the 1,3 propanediol refluxed back into the reactor, thereby forming a PET-derived PTT.

The polyethylene terephthalate (PET) component of the process includes recycled (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The process of preparing the endcapped polyalkylene terephthalate can be either a two-stage process in which the alkylene diol incorporated into the polyalkylene terephthalate is added for both the depolymerization and polymerization stages. Alternatively, a three-stage process in which in which a first dihydric alcohol is used for depolymerization and a second dihydric alcohol, wherein the first dihydric alcohol and second dihydric alcohol are different, is used for polymerization and incorporated into the polyalkylene terephthalate.

For example, in a three-stage process, the first dihydric alcohol can be any $C_2$-$C_4$ alkylene diol that reacts with the PET to depolymerize the polyethylene terephthalate. Examples of suitable first dihydric alcohols are alkylene diols that can include ethylene glycol, 1,2-propylene glycol, 1,3-propylene glycol, 1,2-butanediol, 2,3-butanediol, 1,4-butanediol, and combinations thereof. In one embodiment, the first dihydric alcohol is selected from 1,4-butanediol, 1,3-propanediol, ethylene glycol, and combinations thereof.

The second dihydric alcohol can be any $C_3$-$C_4$ alkylene diol that reacts with the product of depolymerization in the polymerization of the polyalkylene terephthalate. Examples of a suitable second dihydric alcohol can include 1,2-propylene glycol, 1,3-propylene glycol, 1,2-butanediol, 2,3-butanediol, and 1,4-butanediol, For example, the first alkylene diol can be 1,4-butanediol, 1,3-propanediol, ethylene glycol, or combinations thereof and the second alkylene diol can be diethylene glycol, 1,3-propanediol, 1,4-butanediol, or combinations thereof. In one embodiment of the process, the first dihydric alcohol and the second alkylene diol are different. For example, the first dihydric alcohol can be one or more alkylene diols that do not comprise butanediol and the second dihydric alcohol can be 1,4-butanediol.

For example, in a two-stage process of preparing an endcapped PBT from recycled polyethylene terephthalate, a 1,4-butane diol component can react with a polyethylene terephthalate starting material in the presence of an endcapping agent under conditions that depolymerize the polyethylene terephthalate, and a molten mixture of the depolymerized product can be placed under subatmospheric conditions to produce the modified polybutylene terephthalate random copolymer. In a three-stage reaction of preparing a modified PBT, a diol component selected from the group consisting of ethylene glycol, propylene glycol, and combinations thereof can react with a polyethylene terephthalate component in the presence of an endcapping agent under conditions sufficient to depolymerize the polyethylene terephthalate component into a first molten mixture; and the first molten mixture can be combined with 1,4-butane diol under conditions that creates a second molten mixture that is subsequently placed under subatmospheric conditions to produce a modified polybutylene terephthalate random copolymer.

The final endcapped modified polyalkylene terephthalate prepared by the process can be a modified poly(trimethylene terephthalate) derived from petroleum-derived 1,3-propanediol, a modified poly(trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In one embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The endcapped modified polyalkylene terephthalate prepared by the present process comprises the components of the titanium-containing catalyst. Thus, as indicated previously, the endcapped modified polyalkylene terephthalate prepared by the present process comprises 50 to 300 ppm of tetra($C_1$-$C_8$alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates. More specifically, the modified polyalkylene terephthalate prepared by the present process is modified PBT, which comprises 50 to 300 ppm of tetraisopropyl titanate and 100 to 600 ppm of phosphoric acid.

The endcapped modified polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived endcapped modified PBT component ordinarily contains isophthalic acid groups in an amount that is at least 0.1 mol % and can range from 0 or 0.1 to 10 mol % (0 or 0.07 to 7 percent by weight). The PET-derived endcapped modified PBT component ordinarily contains ethylene glycol in an amount that is at least 0.1 mol % and can range from 0.1 to 10 mole %. (0.02 to 2 wt. %). In one embodiment, the PET-derived endcapped modified PBT component has an ethylene glycol content that is more than 0.85 wt. %. The endcapped modified PBT component can also contain diethylene glycol in an amount ranging from 0.1 to 10 mol % (0.04 to 4 wt. %). The amount of the butanediol groups is generally about 98 mol % and can vary from 95 to 99.8 mol % in some embodiments. The amount of the terephthalic acid groups is generally about 98 mol % and can vary from 90 to 99.9 mole % in some embodiments. Unless otherwise specified, all molar amounts of the isophthalic acid groups and or terephthalic acid groups in a polyester are based on the total moles of diacids/diesters in the composition. Unless otherwise specified, all molar amounts of the butanediol, ethylene glycol, and diethylene glycol groups are based on the total moles of diol in the composition.

The endcapped modified polyalkylene terephthalate prepared by the present process is a random polymer that can have a number average molecular weight of at least 10,000 g/mol, specifically at least 15,000 g/mol, and a polydispersity index from 2 to less than 6, specifically 2 to 5. In one embodiment, the modified polyalkylene terephthalate, specifically a modified PBT, has a melting temperature ($T_m$) ranging from 150 to 223° C., specifically 200 to 218° C., more specifically 204 to 210° C.

Specifically, recycled polyethylene terephthalate for use in the present process can be selected or characterized by any one or more, specifically all, of the following: an acetaldehyde content below 5 ppm, a moisture content below 0.5 percent by weight, a halogen (specifically Br and Cl) content below 10 ppm, an iron content less than 10 ppm, a DEG or isophthalate content less that 5 percent by weight, —COOH end groups in an amount below 70 meq/Kg resin, —OH end groups in an amount greater than 30 meq/Kg, a vinyl content less than 0.1%, and a PVC or PC content essentially absent (less that 10 ppm). The resulting product can be obtained and characterized by any one or more, specifically all, of the following: a $M_w$ of 10,000 to 70,000 (or IV of 0.4 to 0.9 dl/g), —COOH end groups in the amount of 5 to 40 meq/Kg resin, OH end groups in the amount of 10 to 70 meq/Kg resin, a Yellowness Index (YI) of 5.0 to 15.0, a phosphorous (P) content of 50 to 1000 ppm, a titanium (Ti) content of 10 to 200 ppm, a mole ratio of P to Ti of 4:1 to 1:1, cobalt in the amount of 10 to 100 ppm, and a DEG content in the polymer of 0.50 to 3.0 mole %.

In the present process, the final polyalkylene terephthalate can be a endcapped poly(trimethylene terephthalate) derived from petroleum-derived 1,3-propanediol, a modified poly (trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the PET used and the reaction conditions. In one embodiment the aromatic dicarboxylic acid group contains from 0.2 to 3.0 mol % of isophthalic acid group and from 90 to 99 mol % percent of terephthalic acid groups, based on the total moles of diacid groups present in the copolymer. Specifically, at least 90 mol %, specifically at least 95 mol %, more specifically at least 98 mol % or about 0 mol %, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mol %, specifically at least 95 mol %, more specifically at least 98 mol % or about 0 mol %, of the diol groups in the modified polyalkylene terephthalate (specifically modified polybutylene terephthalate) are an alkylene diol group derived from the dihydric alcohol used in polymerizing the modified polyalkylene terephthalate.

The endcapped modified polyalkylene terephthalate prepared by the present process can further comprise other residues present in the PET component, including catalyst residues from the manufacture of the PET, residues from additives in the PET, or residues arising from side reactions that occur during manufacture of the PET and/or the reaction of the first alkylene diol and the PET.

For example, residues derived from the endcapped polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

Advantageously, the present process for making PET-derived polyalkylene terephthalate can substantially reduce carbon dioxide emissions and solid waste. Since the modified polyalkylene terephthalate resin compositions made by the inventive process can be made from scrap PET and not monomers, the process can significantly reduce the amount of carbon dioxide emissions and solid waste. In contrast, the process to make DMT or TPA from crude oil is highly energy intensive and as a result, substantial emissions of $CO_2$ to the atmosphere can occur from burning of non-renewable energy sources. By not using DMT or TPA to make the PET-derived PBT, substantial carbon dioxide emissions savings can be obtained.

In one embodiment, a process for making endcapped modified PBT can eliminate at least 1 kg of $CO_2$ emissions for every kilogram of endcapped modified PBT made with the process, as compared to a process that makes virgin PBT homopolymers from monomers. Specifically, the process for making PET-derived endcapped PBT can eliminate from 1 kg to 1.5 kg, or more $CO_2$ emissions for every kilogram of PET-derived endcapped modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of butanediol is from biomass derived, feedstocks such as succinic acid, the carbon dioxide savings can further increase. Furthermore, the fermentation to yield succinic acid requires carbon dioxide as an input, therefore leading to further carbon dioxide reductions.

Accordingly, the present process can produce a modified polybutylene terephthalate random copolymer having a reduced $CO_2$ emissions index, defined as the amount of $CO_2$, expressed in kg, that is saved when one kg of a composition containing the modified polybutylene terephthalate random copolymers is made, as compared to the amount of $CO_2$, expressed in kg, that is created when the composition is made with polybutylene terephthalate that is derived from monomers. Generally, the endcapped modified PBT random copolymers made by the present process can have a reduction in $CO_2$ emissions index that is more than approximately 1.3 kg and can range from 1.3 kg to 2.5 kg.

In one embodiment, the present process is used to prepare a polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The modified polyalkylene terephthalate typically has a number average molecular weight of at least 15,000 g/mol, specifically 20,000 to 200,000 g/mol) and a polydispersity index from 2 to less than 6, specifically 2 to 5. In such an embodiment, the modified polyalkylene terephthalate, specifically the endcapped modified PBT, has a melting temperature ($T_m$) ranging from 150° C. to 223° C., specifically 200° C. to 218° C., more specifically 204° C. to 210° C. The molecular weight can be obtained using polystyrene standards, as measured by gel permeation chromatography in chloroform/hexafluoroisopropanol (5:95, volume/volume ratio) at 25° C.

In one embodiment, the endcapped modified polyalkylene terephthalate is a modified endcapped modified polybutylene terephthalate (PBT) containing 50 to 300 ppm of tetra($C_1$-$C_8$ alkyl) titanate and 100 to 600 ppm of a phosphorous containing compound, both based on the total amount of titanium present, wherein the phosphorous containing compound which is phosphoric acid. The endcapped modified PBT typically has an intrinsic viscosity (as measured in phenol/tetrachloroethane (60:40, w/w ratio) at 25° C.) of 0.4 to 2.0 deciliters per gram. In one embodiment, the PBT resin has an intrinsic viscosity of 0.6 to 1.4 dl/g.

The endcapped modified PBT is typically prepared in a pilot plant by reacting polyethylene terephthalate with 1,4-butanediol in the presence of the catalyst described herein. The ratio of the catalyst complexes (PA:TPT) is typically in the range of 0.15:1 to 0.9:1. The resin is produced via a melt polymerization/solid state polymerization process, wherein melt polymerization involves batch processing (including catalyst preparation), depolymerization, transesterification and polycondensation. Typically a particular IV is targeted for the product obtained from melt polymerization. In one embodiment, the targeted IV is from 0.7-0.9 dL/g. The melt polymerization product is subsequently subjected to solid state polymerization. Typically, a particular IV is targeted for the product obtained from solid state polymerization. In one embodiment, the targeted IV is from 1.0-1.3 dL/g.

A typical example for the preparation of the resin containing the endcapping agent is as follows. First, ethylene glycol (EG) and phosphoric acid (amount depending on the titanium catalyst concentration) are charged into the reactor and the reactor temperature was raised to 120° C. The mass is held at this temperature and atmospheric pressure (approx. 1050 mbar) for 30 minutes to remove the moisture from reaction environment. The calculated amount of titanium isopropoxide (115 ppm of Ti based on the polymer wt.) is added into the reactor and the reactor temperature is raised to 170° C. The mixture is held at that temperature for 70 minutes. Then, rPET and the required amount of dodecanol (0.5, 1, 2 mol % based on PET mol amount) is charged into the reactor (rPET:EG=1:1.5 mol) and the reactor temperature is increased to 225° C. The reactor pressure is set to 3.5 bar. Depolymerization of rPET is completed in 90 min through holding the mixture at these conditions. The purpose of depolymerization is to convert each and every repeat unit of rPET to bis-hydroxy ethyl terephthalate (BHET). After completion of depolymerization, the reactor is depressurized to 1050 mbar. 1,4-Butanediol (BDO) (rPET:BDO=1:3.6 mol ratio) is added to the reactor and the reactor temperature was maintained at 225° C. to complete atmospheric distillation till column top temperature drops. A vacuum of 700 mbar was applied gradually in transesterification step to remove EG while maintaining the reactor temperature at 225° C. for 30 minutes and the overhead line temperature at 180° C. which allowed BDO reflux back into the reactor. EG and BDO are collected as overheads during the transesterification step. The batch is held at that condition until the column top temperature drops 130° C. In the polymerization step, the reactor temperature was increased to 240° C. and a vacuum was applied by gradually reducing the pressure to approximately 1 mbar, to remove excess BDO, THF, and EG as overheads. After stabilizing the vacuum at approximately 1 mbar and the reactor temperature between 240 and 250° C., the torque in the reactor is monitored until achieving the required intrinsic viscosity (IV) (between 0.7 and 0.8 dL/g). Finally, the polymer melt is drained and subjected to pelletization.

Solid State Polymerization. In order to get a high value of IV (1.17-1.25 dL/g) for the resin prepared from recycled PET, low viscosity resins obtained from melt polymerization are subjected to solid state polymerization in a tumbling reactor at 100 mbar (75 Torr) pressure at a temperature of 200° C. for about 18 to 30 h. The IV is checked intermittently during the viscosity build-up and a product with a final IV value of 1.25 is obtained.

In a particular embodiment, the invention is directed to a endcapped modified polyalkylene terephthalate prepared by from recycled polyethylene terephthalate by a melt polymerization process comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid: tetraisopropyl titanate molar ratio of 0.1:1 to 1.2:1;

forming a catalyzed reactant mixture by combination the catalyst solution with polyethylene terephthalate, and an endcapping agent, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and stopping the polymerization when obtaining a modified polybutylene terephthalate having a number average molecular weight of at least 15,000 g/mol.

In another particular embodiment, the invention is directed to an endcapped modified polyalkylene terephthalate prepared by from recycled polyethylene terephthalate by a melt polymerization process comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid: tetraisopropyl titanate molar ratio of 0.1:1 to 1.2:1;

forming a catalyzed reactant mixture by combination the catalyst solution with polyethylene terephthalate and an endcapping agent, optionally with additional butanediol and/or ethylene glycol, and subjecting the catalyzed reactant mixture to heat to obtain substantially complete depolymerization and ester interchange at an elevated second temperature to form a depolymerized mixture;

subjecting the depolymerized mixture to heat to melt residual particles of polyethylene terephthalate at an elevated third temperature higher than the second temperature to obtain a molten depolymerized mixture;

polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and subjecting the polymerized mixture to solid state polymerization at approximately 100 mbar (75 Torr) pressure and a temperature of approximately 200° C. for about 18 to 30 h to obtain a modified polybutylene terephthalate.

The resulting endcapped modified polyalkylene terephthalate contains 50 to 300 ppm of tetra($C_1$-$C_8$ alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and 0.01 to 5 weight percent of an endcapping agent which is a primary monoalcohol having 10 carbon atoms or more and a boiling point of at least 232° C. at atmospheric pressure.

Thermoplastic Composition

The endcapped polyalkylene terephthalate prepared as described above can be blended with other components to form the thermoplastic composition. The thermoplastic composition comprises the endcapped polyalkylene terephthalate, as well as a reinforcing filler and optional additional agents. Additives are ordinarily incorporated into polymer compositions with the proviso that the additives are selected so as to not significantly adversely affect the desired properties of the composition, for example, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents. A good source for information relating to additives is the *Plastics Additives Handbook*, 6$^{th}$ ed. (Hans Zweifel, Ed., 2009).

Combinations of additives can be used, for example, an antioxidant, a UV absorber, and a mold release agent. The total amount of additives (other than any impact modifier, filler, or reinforcing agents) is generally 0.01 to 15 percent by weight, based on the total weight of the composition.

The thermoplastic composition prepared as described herein is characterized by the intentional exclusion of a catalyst quencher such as an acid interchange quencher from the composition. Thus, a process according to the present invention can be further characterized by excluding (not adding) a catalyst quencher as a means for quenching the catalyst in the thermoplastic composition containing the endcapped polyalkylene terephthalate resin composition.

As indicated previously, quenchers are agents that inhibit activity of any catalysts that can be present in the thermoplastic composition, in order to prevent an accelerated interpolymerization and degradation of the polymer in the thermoplastic composition. Such quenchers are selected from the group consisting of acidic phosphate salts, acid phosphites, alkyl phosphites, aryl phosphites, mixed phosphites and combinations thereof, specifically acidic phosphate salts; acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts can include sodium dihydrogen phosphate, mono zinc phosphate, potassium hydrogen phosphate, calcium dihydrogen phosphate and the like. Specific quenchers are phosphoric acid, phosphorous acid or their partial esters such as mono zinc phosphate. More specifically, quenchers can include zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof The thermoplastic composition prepared from the endcapped polyalkylene terephthalate can also comprise at least one reinforcing filler. For example reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 µm, specifically 8-18 µm is impregnated with melted PBT polyester. After cooling, the impregnated bundle is cut into pellets having a length of >5 mm, specifically, above >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 1 to 60 percent by weight, or 5 to 50 percent by weight, specifically from 10 to 45 percent by weight, more specifically from 20 to 40 percent by weight, and most specifically, from 25 to 35 percent by weight.

In still other embodiments, the compositions can optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

In addition to the reinforcing filler, the thermoplastic composition can further comprise a chain extender. Many chain extenders are known and are commercially available. In one embodiment, the thermoplastic composition comprises 1 to 5 percent by weight of a chain extender. In a particular embodiment, the chain extender is an epoxy chain extender such as 3,4-epoxycyclohexylmethyl-3',4'-epoxycyclohexane carboxylate. More particularly, about 1 to 4 percent by weight of 3,4-epoxycyclohexylmethyl-3',4'-epoxycyclohexane carboxylate are present in the thermoplastic composition of the invention. More particularly, about 1.5 to about 3 percent by weight of 3,4-epoxycyclohexylmethyl-3',4'-epoxycyclohexane carboxylate is present in the thermoplastic composition of the invention.

In addition to the reinforcing filler and chain extender, the thermoplastic composition can optionally contain a stabilizer. Many stabilizers are known and are commercially available. In one embodiment, the thermoplastic composition further comprises 0.01 to 1 percent by weight of a stabilizer. In a particular embodiment, the stabilizer is pentaerythritol-tetrakis(3-(3,5-di-tert.butyl-4-hydroxy-phenyl-)propionate), CAS Reg. No. 6683-19-8, which is available from BASF Corp. More particularly, about 0.02 to 0.08 percent by weight of pentaerythritol-tetrakis(3-(3,5-di-tert-.butyl-4-hydroxy-phenyl-)propionate) is present in the thermoplastic composition of the invention. More particularly, about 0.03 to 0.07 percent by weight of pentaerythritol-tetrakis(3-(3,5-di-tert.butyl-4-hydroxy-phenyl-)propionate) is present in the thermoplastic composition of the invention.

In addition to the reinforcing filler, chain extender, and stabilizer, the thermoplastic composition can optionally further comprise an impact modifier. Many impact modifiers are known and are commercially available. In one embodiment, the thermoplastic composition comprises 0.01 to 20 percent by weight of an impact modifier. In a more particular embodiment, the thermoplastic composition comprises 1 to 20 percent by weight of an impact modifier. In a particular embodiment, the impact modifier is linear low density polyethylene (LLDPE). More particularly, about 1 to 10 percent by weight of LLDPE is present in the thermoplastic composition of the invention. More particularly, about 2 to about 8 percent by weight of LLDPE is present in the thermoplastic composition of the invention.

In addition to the reinforcing filler, chain extender, stabilizer, and impact modifier, the thermoplastic composition can optionally comprise other additives. As indicated above, such additives include other impact modifiers, fillers, reinforcing agents, anti-oxidants, heat stabilizers, light stabilizers, ultraviolet light (UV) absorbers, as well as plasticizers, lubricants, mold release agents, antistatic agents, colorants, blowing agents, melt strength additives, flame retardants, and anti-drip agents.

In addition to the above-described additives, used accessorily in a small amount, depending on the object, other polymers or resins, typically in an amount less than 50 weight percent, specifically less than 30 percent by weight, more specifically less that 20 percent by weight, of the total composition, can be added to the thermoplastic resin composition containing the polyethylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to the endcapped polyalkylene terephthalate, other polyesters can optionally be present in the composition (in an amount of less than 50 weight percent, specifically less than 30 percent by weight, more specifically less that 20 percent by weight, most specifically less than 10 percent by weight of the total composition, provided that such polyesters do not significantly and adversely affect the desired properties of the composition.

For example, a thermoplastic composition can include, in addition to the endcapped polyalkylene terephthalate prepared by the present process other aromatic polyesters, cycloaliphatic polyesters, and the like. The additional polyesters can be virgin polyesters or wholly or partially bio-derived, including petroleum-derived aromatic polyesters and bio-derived aromatic polyesters.

ADDITIONAL EMBODIMENTS

Embodiment 1

A thermoplastic composition with improved hydrostability and increased crystallization rate, comprising:
50 to 99.99 percent by weight of an endcapped polyalkylene terephthalate containing 50 to 300 ppm of tetra($C_1$-$C_8$ alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and
0 to 60 percent by weight of a reinforcing filler; and
wherein the endcapped polyalkylene terephthalate contains 0.01 to 5 weight percent of an endcapping agent which is a primary monoalcohol having 10 carbon atoms or more and a boiling point of at least 232° C. at atmospheric pressure;
wherein all weight percents are based on the total weight of the composition; and
wherein no quencher for the catalyst complex is added to the compounded thermoplastic composition.

Embodiment 2

The thermoplastic composition of embodiment 2, wherein the endcapped polyalkylene terephthalate is an endcapped polybutylene terephthalate.

Embodiment 3

The thermoplastic composition of embodiment 1, wherein the endcapped polyalkylene terephthalate is prepared from recycled polyethylene terephthalate or from virgin feedstocks.

Embodiment 4

The thermoplastic composition of embodiment 1, wherein the tetra($C_1$-$C_8$ alkyl) titanate is tetraisopropyl titanate and the phosphorous containing compound is phosphoric acid. 5. The thermoplastic composition of embodiment 1, wherein the reinforcing filler is glass fiber.

Embodiment 5

The thermoplastic composition of claim 1, wherein the reinforcing filler selected from glass fibers, carbon fibers, metal fibers, ceramic fibers or whiskers, such as wollastonite, polymeric fibers, alumina, amorphous silica, aluminosilicates, mica, clay, talc, glass flake, glass microspheres, metal oxides and ground quartz, and combinations thereof.

Embodiment 6

The thermoplastic composition of embodiment 5, comprising 25 to 35 percent by weight of glass fiber.

Embodiment 7

The thermoplastic composition of embodiment 7, wherein the endcapping agent is selected from the group consisting of 1-decanol, 1-undecanol, 1-dodecanol, 1-tridecanol, 1-tetradecanol, 1-dentadecanol, 1 hexadecanol, 1-heptadecanol, 1-octadecanol, 1-nonadecanol, 1-eicosanol, 1-heneicosanol, 1-docosanol, 1-tetracosanol, 1-hexacosanol, 1-heptacosanol, 1-octacosanol, 1-nonacosanol. 1-triacontanol, 1-dotriacontanol, and 1-tetratriacontanol.

Embodiment 8

The thermoplastic composition of embodiment 7, wherein the endcapping agent is selected from the group consisting of 1-decanol, 1-undecanol, 1-dodecanol, and 1-tridecanol.

Embodiment 9

The thermoplastic composition of embodiment 1, further comprising 0.01 to 1 percent by weight of a stabilizer.

Embodiment 10

The thermoplastic composition of embodiment 9, comprising 0.03 to 0.07 percent by weight of a stabilizer which is pentaerythritol tetrakis(3,5-di-tert-butyl-4-hydroxyhydrocinnamate Embodiment 11

The thermoplastic composition of embodiment 1, further comprising 1 to 20 percent by weight of an impact modifier.

Embodiment 12

The thermoplastic composition of embodiment 11, comprising 2 to 8 percent by weight of an impact modifier which is linear low density polyethylene.

Embodiment 13

The thermoplastic composition of embodiment 1, comprising:
from 50 to 99.99 percent by weight of an endcapped polyalkylene terephthalate, wherein the endcapped polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;
from 0 to 60 percent by weight of a reinforcing filler which is glass;
wherein the endcapped polyalkylene terephthalate contains 0.01 to 3 weight percent of an endcapping agent which is a primary or secondary alcohol having 10 carbon atoms or more and a boiling point of at least 232° C. at atmospheric pressure;
from 0 to 30 percent by weight of an impact modifier; and
from 0 to 5 percent by weight of an additive selected from a nucleating agent, antioxidant, UV stabilizer, plasticizer, epoxy compound, melt strength additive, or a combination thereof, crosslinkers, and combinations thereof.

Embodiment 14

The thermoplastic composition of embodiment 13, comprising:
from 50 to 99.99 percent by weight of a endcapped polyalkylene terephthalate, wherein the endcapped polyalkylene terephthalate containing 50 to 300 ppm of tetra($C_1$-$C_8$ alkyl) titanate and 100 to 600 ppm of a phosphorous containing compound, both based on the total amount of titanium present, wherein phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;
from 0 to 60 percent by weight of a reinforcing filler which is glass;
wherein the endcapped polyalkylene terephthalate contains 0.01 to 2.5 weight percent of an endcapping agent which is a primary alcohol having 10 carbon atoms or more and a boiling point of at least 232° C. at atmospheric pressure;
from 0 to 1 percent by weight of a stabilizer;
from 0 to 10 percent by weight of an impact modifier;
from 0 to 5 percent by weight of a chain extender.

Embodiment 15

The thermoplastic composition of embodiment 13, comprising:
from 50 to 99.99 percent by weight of a modified polybutylene terephthalate, wherein the endcapped polyalkylene terephthalate contains 100 to 300 ppm of tetraisopropyl titanate and 30 to 100 ppm of phosphoric acid;
from 1 to 60 percent by weight of a reinforcing filler which is glass;
wherein the modified endcapped polyalkylene terephthalate contains 0.01 to 2.5 weight percent of an endcapping agent which is a primary alcohol selected from the group consisting of 1-decanol, 1-undecanol, 1-dodecanol, and 1-tridecanol;
from 0.01 to 1 percent by weight of a stabilizer;
from 1 to 10 percent by weight of an impact modifier; and
from 1 to 5 percent by weight of a chain extender.

Embodiment 16

The thermoplastic composition of embodiment 13, comprising:
from 50 to 99.99 percent by weight of a modified polybutylene terephthalate, wherein the endcapped polyalkylene terephthalate contains 100 to 300 ppm of tetraisopropyl titanate and 30 to 100 ppm of phosphoric acid;
from 5 to 50 percent by weight of a reinforcing filler which is glass;
wherein the endcapped polyalkylene terephthalate contains 0.01 to 2.5 weight percent of an endcapping agent which is a primary alcohol selected from the group consisting of 1-decanol, 1-undecanol, 1-dodecanol, and 1-tridecanol;
from 0.02 to 0.08 percent by weight of a stabilizer;
from 1 to 10 percent by weight of an impact modifier; and
from 1 to 4 percent by weight of a chain extender.

Embodiment 17

The thermoplastic composition of embodiment 13, comprising:
from 50 to 99.99 percent by weight of a modified polybutylene terephthalate containing 50 to 300 ppm of tetraisopropyl titanate and 100 to 600 ppm of phosphoric acid;
from 25 to 35 percent by weight of a reinforcing filler which is glass;
wherein the endcapped polyalkylene terephthalate contains 0.01 to 2.5 weight percent of an endcapping agent which is 1-dodecanol;

from 0.03 to 0.07 percent by weight of a stabilizer;
from 2 to 8 percent by weight of an impact modifier; and
from 1.5 to 3 percent by weight of a chain extender

Embodiment 18

The composition of embodiment 17, comprising 1.5 to 3 weight percent of a chain extender which is 3,4-epoxycyclohexylmethyl-3',4'-epoxycyclohexane carboxylate.

Embodiment 19

An endcapped polyalkylene terephthalate containing 50 to 300 ppm of tetra($C_1$-$C_8$alkyl) titanate and 100 to 600 ppm of a phosphorous contains compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and
wherein the modified endcapped polyalkylene terephthalate contains 0.01 to 5 weight percent of an endcapping agent which is a primary monoalcohol having 10 carbon atoms or more and a boiling point of at least 232° C. at atmospheric pressure.

Embodiment 20

The endcapped polyalkylene terephthalate of embodiment 19, which is a modified polybutylene terephthalate.

Embodiment 21

The endcapped polyalkylene terephthalate of embodiment 19, wherein the endcapped polyalkylene terephthalate is prepared from recycled polyethylene terephthalate.

Embodiment 22

The endcapped polyalkylene terephthalate of embodiment 19, wherein the tetra($C_1$-$C_8$alkyl) titanate is tetraisopropyl titanate and the phosphorous containing compound is phosphoric acid.

Embodiment 23

The endcapped polyalkylene terephthalate of embodiment 19, wherein the endcapping agent is selected from the group consisting of 1-decanol, 1-undecanol, 1-dodecanol, 1-tridecanol, 1-tetradecanol, 1-dentadecanol, 1 hexadecanol, 1-heptadecanol, 1-octadecanol, 1-nonadecanol, 1-eicosanol, 1-heneicosanol, 1-docosanol, 1-tetracosanol, 1-hexacosanol, 1-heptacosanol, 1-octacosanol, 1-nonacosanol. 1-triacontanol, 1-dotriacontanol, and 1-tetratriacontanol.

Embodiment 24

The endcapped polyalkylene terephthalate of embodiment 19, wherein the endcapping agent is selected from the group consisting of 1-decanol, 1-undecanol, 1-dodecanol, and 1-tridecanol.

Embodiment 25

A process for preparing an endcapped polyalkylene terephthalate from recycled polyethylene terephthalate, comprising:

forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid:tetraisopropyl titanate molar ratio of 0.1:1 to 1.2:1;
forming a catalyzed reactant mixture by combination the catalyst solution with polyethylene terephthalate, and an endcapping agent, optionally with additional butanediol and/or ethylene glycol, and subjecting the catalyzed reactant mixture to heat to obtain substantially complete depolymerization and ester interchange at an elevated second temperature to form a depolymerized mixture;
subjecting the depolymerized mixture to heat to melt residual particles of polyethylene terephthalate at an elevated third temperature higher than the second temperature to obtain a molten depolymerized mixture;
polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and
stopping the polymerization when obtaining a modified polybutylene terephthalate having a number average molecular weight of at least 15,000 g/mol.

Embodiment 26

An article prepared from the thermoplastic composition of embodiment 1 or embodiment 11.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. The examples are annotated as "EX." and comparative examples are annotated hereinafter as "CEX", employed the materials listed in Table 1. The invention is further described in the following illustrative examples in which all parts and percentages are by weight unless otherwise indicated.

TABLE 1

| Component | Trade Name and Supplier |
|---|---|
| BDO | 1,4-Butanediol, CAS Reg. No. 110-6304, from BASF. |
| PA | Phosphoric Acid CAS Reg. No. 7664-38-2, from Acros. |
| TPT | Tetraisopropyl titanate, CAS Reg. No. 546-68-9, from DuPont, commercial Tyzor grade |
| DMT | Dimethyl Terephthlate, CAS Reg. No. 120-61-6., from Invista |
| PE-I 315 ("Virgin PBT") | Polybutylene Terephthalate (PBT) sold by SABIC Innovative Plastics as VALOX ® 315 with an intrinsic viscosity of 1.2 cm³/g as measured in a 60:40 phenol/tetrachloroethane. |

TABLE 1-continued

| Component | Trade Name and Supplier |
|---|---|
| PE-I 195 | Polybutylene Terephthalate (PBT) sold by SABIC Innovative Plastics as VALOX ® 195 with an intrinsic viscosity of 0.66 cm³/g as measured in a 60:40 phenol/tetrachloroethane. |
| PE-II 315 | Modified Polybutylene Terephthalate (PBT) prepared from recycled PET and sold by SABIC Innovative Plastics as iQ VALOX ® 315 with an intrinsic viscosity of 1.2 cm³/g as measured in a 60:40 phenol/tetrachloroethane. |
| PE-II 195 | Modified Polybutylene Terephthalate (PBT) prepared from recycled PET and sold by SABIC Innovative Plastics as iQ VALOX ® 195 with an intrinsic viscosity of 0.66 cm³/g as measured in a 60:40 phenol/tetrachloroethane. |
| PE-III | Modified Polybutylene Terephthalate (PBT) prepared as described below containing varying amounts of 1-dodecanol. |
| PBT Glass | ChopVantage ® HP 3770: Chopped 13-micron diameter fiberglass for use with PBT, obtained from PPG Ind. |
| LLDPE | Linear low density polyethylene, from Nova Chemicals, Corp. |
| Hindered Phenol Stabilizer | Pentaerythritol-tetrakis(3-(3,5-di-tert.butyl-4-hydroxyphenyl-)propionate), CAS Reg. No. 6683-19-8, available from BASF Corp. |
| Sodium Stearate | CAS Reg. No. 822-16-2, obtained as Sodium Stearate T-1 from Chemtura Corp. |
| Cycloaliphatic Epoxy Resin | 3,4-Epoxycyclohexylmethyl-3',4'-epoxycyclohexane carboxylate, CAS Reg. No. 2386-87-0, available as Celloxide 2021P from Daicel Chemical Industries. |
| Endcapping Agent | 1-Dodecanol, CAS Reg. No. 112-53-8, |
| Recycled PET | Obtained from Futura Polyesters Ltd. |

As indicated in Table 1, recycled PET was obtained from Futura Polyesters, Ltd. The recycled polyester was prepared for processing as follows. The post-consumer PET scrap or bottle scrap were collected and hydraulically compressed in the form of bales. The bales were then transported to the cleaning sites. De-baling was achieved using hot water, enabling the bottles to loosen up from the tightly compressed bales to free bottles. Additionally, subjecting the bottles to hot water loosened the sticker from the bottles. Any polyvinyl chloride bottles turned milky white post the hot water wash and were removed. The sorted (clear) bottles were ground to flakes of 3 mm to 5 mm size. The flakes were then subject to hydro-flotation. In hydro-flotation, polypropylene and paper were removed from PET flakes by density separation. The clean PET flakes were alkali washed to remove any glue. The PET flakes were subjected to two cycles of process-water wash and one cycle of washing using demineralized water. The clean flakes were then dried and bagged.

Preparation of Endcapped PBT from Recycled PET Using an In-Situ PA: TPT Catalyst Endcapped PBT was prepared in a pilot plant by reacting recycled polyethylene terephthalate with 1,4-butanediol and 1-dodecanol with catalyst ratios (TPT:PA) of 1:0.65). All the resins were produced via a two-step process. The first step (Part A) involved batch processing via melt polymerization, including catalyst preparation, depolymerization, transesterification and polycondensation. An IV of 0.75 dL/g was targeted at the end of this process. The second step involved solid state polymerization (SSP) processing. An IV of 1.2 dL/g was targeted at the end of this process.

Part A: Batch Process via Melt Polymerization. The melt polymerization process was carried in a pilot plant equipped with a single batch reactor. The process involved four steps: in-situ catalyst preparation, depolymerization of recycled PET (rPET), ester interchange (EI), and polymerization.

First, ethylene glycol (EG) and phosphoric acid (amount depending on the titanium catalyst concentration) were charged into the reactor and the reactor temperature was raised to 120° C. The mass was hold at this temperature and atmospheric pressure (approximately 1050 mbar) for 30 min to remove the moisture from reaction environment. The calculated amount of titanium isopropoxide (115 ppm of Ti based on the polymer wt.) was added into the reactor and the reactor temperature was raised to 170° C. The mixture was held at that temperature for 70 min. Then, rPET and the required amount of dodecanol (0.5, 1, 2 mol % based on PET mol amount) was charged into the reactor (rPET:EG=1:1.5 mol) and the reactor temperature was increased to 225° C. The reactor pressure was set to 3.5 bar. Depolymerization of rPET was completed in 90 min through holding the mixture at these conditions. The purpose of depolymerization was to convert each and every repeat unit of rPET to bis-hydroxy ethyl terephthalate (BHET). After completion of depolymerization, the reactor was depressurized to 1050 mbar. 1,4-Butanediol (BDO) (rPET:BDO=1:3.6 mol ratio) was added to the reactor and the reactor temperature was maintained at 225° C. to complete atmospheric distillation till column top temperature drops. A vacuum of 700 mbar was applied gradually in transesterification step to remove EG while maintain the reactor temperature at 225° C. for 30 min and overhead line temperature at 180° C. which allowed BDO reflux back into the reactor. EG and BDO were collected as overheads during the transesterification step. The batch was hold at that condition till the column top temperature drops 130° C. In polymerization step, the reactor temperature was increased to 240° C. and a vacuum was applied by gradually reducing the pressure to ~1 mbar, to remove excess BDO, THF, and EG as overheads. After stabilizing the vacuum at ~1 mbar and the reactor temperature between 240 and 250° C., the torque in the reactor was monitored until achieving the required intrinsic viscosity (IV) (between 0.7 and 0.8 dL/g). Finally, the polymer melt was drained and subjected to pelletize.

Depolymerization of rPET to bis-hydroxy ethyl terephthalate (BHET) was completed in 90 minutes by holding the mixture at these conditions. After completion of depolymerization, the reactor was depressurized to 1050 mbar. BDO (rPET:BDO=1:3.6 mol ratio) was added to the reactor and the reactor temperature was maintained at 225° C. to complete atmospheric distillation until the column top temperature dropped. A vacuum of 700 mbar was applied gradually in the transesterification step to remove EG while maintaining the reactor temperature at 225° C. for 30 minutes and the overhead line temperature at 180° C. which allowed BDO reflux back into the reactor. EG and BDO were collected as overheads during the transesterification step. The batch was held at these conditions until the column top temperature dropped to 130° C. In the polymerization step, the reactor temperature was increased to 240° C. and a vacuum was applied by gradually reducing the pressure to approximately 1 mbar, to remove excess BDO, THF, and EG as overheads. After stabilizing the vacuum at approximately 1 mbar and the reactor temperature between 240 and 250° C., the torque in the reactor was monitored until achieving the required intrinsic viscosity (IV) (between 0.7 and 0.8 dL/g). Finally, the polymer melt was drained and then pelletized.

Part B: Solid State Polymerization. In order to get a high value of IV (1.17-1.25 dL/g) for the resin prepared from rPET, low viscosity resins obtained from the batch process were subjected to solid state polymerization in a tumbling reactor at 100 mbar pressure at a temperature of 200° C. for about 18 to 30 h. The IV was checked intermittently during the viscosity build-up and a product with a final IV value of 1.25 was obtained.

Extrusion, Molding, and Testing

For the compositions disclosed herein, ingredients were tumble blended and then extruded on 27 mm twin-screw extruder with a vacuum vented mixing screw, at a barrel and die head temperature between 240 to 265° C. and a 300 rpm screw speed. The extrudate was cooled through a water bath prior to pelletizing. ASTM tensile, Izod and flexural bars were injection molded on a van Dorn molding machine with a set temperature of approximately 240-265° C. The pellets were dried for 3-4 hours at 120° C. in a forced air-circulating oven prior to injection molding.

Notched and un-notched Izod testing was done on 75 mm×12.5 mm×3.2 mm bars using ASTM method D256 at both 23° C. and −30° C. using 5 lbf/ft pendulum energy.

Tensile properties were measured according to ASTM D 638 at 23° C. and 50 mm/min speed for 5 mm/min for K4560 examples.

Flexural properties were tested per ASTM D790 with 3.2 mm thickness specimen and 1.27 mm/min speed.

Specific gravity was measured per ASTM D792.

Vicat softening temperature was tested per ASTM D1525 with 10 N load and 50° C./Hour temperate rate. Vicat temperature was tested on both regular molded examples as well as abusively molded examples. Abusive molding here refers to molding conditions that have 15° C. higher barrel temperature and double dwelling time than regular molding.

Heat deflection temperature (HDT) was tested per ASTM D648 with 1.82 MPa stress on 3.2 mm thickness specimens.

Melt volume-flow rate (MVR) was tested per ASTM D1238 at 250° C. with 5 kg load and 240 s dwell time.

Melt viscosity was determined as a function of time at 265° C. for 30 minutes. This test is also known as "time-sweep". Percent viscosity change was reported.

Hydrostability Tensile and Izod bars were aged in a pressure cooker at 110° C. and 100% relative humidity. Izod and tensile performance of the specimens were measured after 1 day, 2 days, and 5 days 9 days in the pressure cooker.

$^1$H NMR spectroscopy allowed confirmation of the structures of the polymers synthesized. Polymer samples were first dissolved in a 70/30 mixture of deuterated TFA/chloroform and then subjected to $^1$H for compositional analysis.

Differential scanning calorimetry (DSC) analysis was conducted on all examples with a ramp rate of 20° C./min and temperature range of 40 to 300° C.

Color (L*, a*, and b*) values were obtained through the diffuse reflectance method using a Gretag Macbeth Color-Eye 7000A with D65 illumination.

The intrinsic viscosity (IV) of the polymer was measured using an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries). Two measurements were taken for each sample, and the result reported was the average of the two measurements.

Carboxylic acid end group concentration (—COOH) was measured through manual titration and is reported in meq/g. The sample resin was dissolved in phenol and dichlorobenzene solvents. Potassium hydroxide in methanol was used as titrant and bromo phenol blue was used as indicator. The analysis was conducted under room temperature and end point color is blue.

Titanium and phosphorous concentrations were obtained from elemental analysis using inductive coupling plasma (ICP) microwave method to confirm the molar ratio of catalyst reactants, TPT and HP.

Non-Isothermal Crystallization:

The study of melting and non-isothermal crystallization behaviors of resins was carried out on a TA Instruments Q 1000 differential scanning calorimeter (DSC) using samples weighting approximately 5 mg. The samples were first heated to 290° C. at 20° C./minute ramp and then maintained at 290° C. for 5 minutes to eliminate the thermal history. Each sample was then cooled to 80° C. at cooling rates of 20, 40, or 60° C./minute. All experiments were carried out under a nitrogen atmosphere and the nitrogen flow rate was 50 mL/minute. The method log for the study is provided below.

Method Log:
1: Ramp 20.00° C./min to 290.00° C.
2: Mark end of cycle 0
3: Isothermal for 2.00 min
4: Mark end of cycle 1
5: Ramp 60.00° C./min to 40.00° C.
6: Mark end of cycle 2
7: End of method Isothermal Crystallization:

The isothermal crystallization behavior of resins was investigated on a TA Instruments Q1000 DSC using samples weighing approximately 5 mg. The samples were first heated to 290° C. at 20° C./minute ramp and then maintained for 5 minutes to eliminate the thermal history. Each sample was then cooled to a crystallization temperature (180° C.) and held isothermally at the crystallization temperature for 10 minutes. The cooling rates were 20, 40, and 60° C./minute. All experiments were carried out under a nitrogen atmosphere and the nitrogen flow rate was 50 mL/minute. The method log for the study is provided below.

Method Log:
1: Ramp 20.00° C./min to 290.00° C.
2: Mark end of cycle 0
3: Isothermal for 2.00 min
4: Mark end of cycle 1
5: Ramp 60.00° C./min to 180.00° C.
6: Mark end of cycle 2
7: Isothermal for 20.00 min
8: Mark end of cycle 3
9: End of method Hydrolysis Tests Tensile and Izod bars were aged in a pressure cooker at 110° C. and 100% relative humidity. Specimens were drawn from the pressure cooker after 1 day, 2 days, 5 days, and 9 days.

Results

A telechelic polymer is a prepolymer that is capable of entering into further polymerization or other reactions through its reactive endgroups. Telechelic polyesters are of interest since changes in the nature of polyester end groups can lead to considerable improvements in polyester thermal stability, hydrostability, and crystallization behavior. The attractiveness of such modification is due to the ease of its implementation in the resin production process with limited or no additional cost.

As described herein, a monofunctional primary alcohol (dodecanol) was used as an end-cap agent to reduce the carboxylic acid end group concentration in the final resin. Dodecanol is a renewable monofunctional primary alcohol having a boiling point of 259° C. at atmospheric pressure. For the primary monoalcohol endcap agent, it is important that the alcohol has a high boiling point, since the process temperature for making the resin is in the range of 240° C. under vacuum.

Six dodecanol end-cap resins were prepared by increasing the dodecanol feed. CEX1 was a comparative example that contained no 1-dodecanol. CEX1 underwent batch processing and solid state polymerization. EX1 and EX2 were end capped by 0.5 mol % dodecanol. EX3 and EX4 were end capped by 1 mol % dodecanol. EX5 and EX6 were end capped by 2 mol % dodecanol.

Tables 2A and 2B show the process parameters for the resins. The EX1, EX3, and EX5 resins summarized were produced via two steps as described in Parts A and B above. The first step (Part A) was the batch processing including catalyst preparation, depolymerization (including addition of 1-dodecanol), transesterification and polycondensation. An IV of 0.75 dL/g was targeted for the end of this process. The second step (Part B) was solid state polymerization targeting an IV of 1.2 dL/g. EX1, EX3, and EX5 resins exhibited the targeted IV and had the same color. The carboxylic acid end group concentration (—COOH) of the EX1, EX3, and EX5 resins decreased from 0.5 to 1 percent dodecanol feed. The increase of dodecanol feed from 1 mol % to 2 mol % did not affect carboxylic acid end group concentration (—COOH).

The EX2, EX4, AND EX6 resins summarized in Tables 2A and 2B were produced via one step (batch processing as provided in Part A). The EX2, EX4, AND EX6 resins exhibited the targeted IV, as well as the same color and backbone composition. The carboxylic acid end group concentration (—COOH) of the EX2, EX4, AND EX6 resins decreased gradually with increasing dodecanol feed from 0.5 mol % to 2 mol %, indicating the successful incorporation of dodecanol end-cap with the carboxylic acid end group functionality of the modified polybutylene terephthalate chains.

TABLE 2A

|  | UNITS | PBT from Recycled PET (IQ PBT) CEX1 | | PBT from Recycled PET (IQ PBT) with 1-Dodecanol (0.5%) EX1 | | EX2 | |
| --- | --- | --- | --- | --- | --- | --- | --- |
| PARAMETER |  |  |  |  |  |  |  |
| Batch weight | Kg | 10 | 10 | 10 | 10 | 10 | 10 |
| Molar ratio (PET:BDO) | Ratio | 1:3.6 | 1:3.6 | 1:3.6 | 1:3.6 | 1:3.6 | 1:3.6 |
| White Flakes/PCR PET CHIPS | Kg | 8.73 |  | 8.73 | 8.73 | 8.73 | 8.73 |
| MEG FOR DEPOLY | Kg | 4.23 | 4.23 | 4.23 | 4.23 | 4.23 | 4.23 |
| BDO | Kg | 14.73 | 14.73 | 14.73 | 14.73 | 14.73 | 14.73 |
| TPT - CATALYST (115 ppm) | g | 6.81 | 6.81 | 6.81 | 6.81 | 6.81 | 6.81 |
| OPA (85% p) | g | 1.79 | 1.79 | 1.80 | 1.80 | 1.80 | 1.80 |
| Molar ratio (TPT:OPA) | — | 1:0.65 | 1:0.65 | 1:0.65 | 1:0.65 | 1:0.65 | 1:0.65 |
| 1-Dodecanol | % | — | — | 0.5% | 0.5% | 0.5% | 0.5% |
| Quality Parameters | — | — | — | — | — | — | — |
| IV | dl/g | 0.731 | 0.722 | 0.733 | 0.741 | 0.741 | 0.729 |
| L | CIE | 68.8 | 66.7 | 70.8 | 67.9 | 70.1 | 71.4 |
| a | CIE | −1.60 | −1.20 | −1.50 | −1.10 | −1.20 | −1.60 |
| b | CIE | 3.4 | 4.8 | 1.2 | 1.0 | 0.8 | 1.1 |
| COOH | meq/g | 23 | 23 | 18 | 20 | 17 | 17 |
| Diethylene Glycol (DEG) | % | — | 0.59 | — | 0.56 | 0.46 | 0.49 |
| Isophthalic Acid (IPA) | % | — | 1.46 | — | 1.66 | 1.41 | 1.55 |
| Ethylene Glycol (EG) | % | — | 0.55 | — | 0.76 | 0.74 | 0.66 |
| Process Parameters | — | — | — | — | — | — | — |
| Total Esterification time | min | 650 | 630 | 625 | 660 | 660 | 650 |
| Esterification end temp | C. | 225 | 225 | 225 | 225 | 225 | 225 |
| Poly cycle time | min | 172 | 170 | 180 | 189 | 187 | 175 |
| Poly final temp | ° C. | 250 | 250 | 250 | 250 | 250 | 250 |
| Delta KW set | KW | 80/10 | 80/10 | 80/10 | 80/10 | 80/10 | 80/10 |
| SSP Process Parameters |  |  |  |  |  |  |  |
| SSP PARAMETERS (Batch size) | kg | 15 |  | 16.1 |  |  |  |
| IV | d/g | 1.227 |  | 1.206 |  |  |  |
| L* | CIE Lab | 71.45 |  | 71 |  |  |  |
| a* | CIE Lab | −1.1 |  | −0.6 |  |  |  |
| b* | CIE Lab | 4.8 |  | 3.2 |  |  |  |
| COOH | meq/g |  |  | 14 |  |  |  |
| Processing temperature | ° C. | 200 |  | 200 |  |  |  |
| Delta IV Increase | dl/g | 0.500 |  | 0.469 |  |  |  |
| Residence time at reaction temperature | Hrs | 27 |  | 25 |  |  |  |
| IV build up rate | units/hr | 0.0185 |  | 0.0188 |  |  |  |

Example 2B

| | UNITS | PBT from Recycled PET (IQ PBT) with1-Dodecanol (1%) | | | | PBT from Recycled PET (IQ PBT) with1-Dodecanol (2%) | | | |
|---|---|---|---|---|---|---|---|---|---|
| | | EX3 | | EX4 | | EX5 | | EX6 | |
| PARAMETER | | | | | | | | | |
| Batch weight | Kg | 10 | 10 | 10 | 10 | 10 | 10 | 10 | 10 |
| Molar ratio (PET:BDO) | Ratio | 1:3.6 | 1:3.6 | 1:3.6 | 1:3.6 | 1:3.6 | 1:3.6 | 1:3.6 | 1:3.6 |
| White Flakes/PCR PET CHIPS | Kg | 8.73 | 8.73 | 8.73 | 8.73 | 8.73 | 8.73 | 8.73 | 8.73 |
| MEG FOR DEPOLY | Kg | 4.23 | 4.23 | 4.23 | 4.23 | 4.23 | 4.23 | 4.23 | 4.23 |
| BDO | Kg | 14.73 | 14.73 | 14.73 | 14.73 | 14.73 | 14.73 | 14.73 | 14.73 |
| TPT - CATALYST (115 ppm) | g | 6.81 | 6.81 | 6.81 | 6.81 | 6.81 | 6.81 | 6.81 | 6.81 |
| OPA (85% p) | g | 1.80 | 1.80 | 1.80 | 1.80 | 1.80 | 1.80 | 1.80 | 1.80 |
| Molar ratio (TPT:OPA) | — | 1:0.65 | 1:0.65 | 1:0.65 | 1:0.65 | 1:0.65 | 1:0.65 | 1:0.65 | 1:0.65 |
| 1-Dodecanol | % | 1.0% | 1.0% | 1.0% | 1.0% | 2.0% | 2.0% | 2.0% | 2.0% |
| Quality Parameters | — | — | — | — | — | — | — | — | — |
| IV | dl/g | 0.731 | 0.734 | 0.733 | 0.737 | 0.746 | 0.722 | 0.725 | 0.722 |
| L | CIE | 68.6 | 71.2 | 69.8 | 71.3 | 70.0 | 72.8 | 67.6 | 73.2 |
| a | CIE | −1.10 | −1.60 | −1.20 | −1.30 | −1.50 | −2.00 | −0.80 | −1.80 |
| b | CIE | 1.3 | 0.7 | 1.2 | 0.8 | 1.3 | 1.4 | 0.7 | −0.2 |
| COOH | meq/g | 13 | 11 | 12 | 11 | 9 | 10 | 11 | 11 |
| DEG | % | 0.57 | 0.45 | 0.46 | 0.48 | 0.34 | 0.39 | 0.34 | 0.39 |
| IPA | % | 1.50 | 1.36 | 1.66 | 1.40 | 1.51 | 1.38 | 1.37 | 1.41 |
| CEG | % | 0.59 | 0.68 | 0.74 | 0.71 | 0.73 | 0.71 | 0.70 | 0.74 |
| Process Parameters | — | — | — | — | — | — | — | — | — |
| Total Esterification time | min | 655 | 645 | 655 | 640 | 680 | 675 | 665 | 650 |
| Esterification end temp | C. | 225 | 225 | 225 | 225 | 225 | 225 | 225 | 225 |
| Poly cycle time | min | 179 | 191 | 180 | 170 | 164 | 165 | 175 | 170 |
| Poly final temp | ° C. | 250 | 250 | 250 | 250 | 250 | 250 | 250 | 250 |
| Delta KW set | KW | 80/10 | 80/10 | 80/10 | 80/10 | 80/10 | 80/10 | 80/10 | 80/10 |
| SSP Process Parameters | | | | | | | | | |
| SSP PARAMETERS (Batch size) | kg | 17.1 | | | | 16.9 | | | |
| IV | d/g | 1.23 | | | | 1.219 | | | |
| L* | CIE Lab | 74.1 | | | | 72.5 | | | |
| a* | CIE Lab | −0.6 | | | | −0.7 | | | |
| b* | CIE Lab | 3.9 | | | | 3.1 | | | |
| COOH | meq/g | 7 | | | | 6 | | | |
| Processing temperature | ° C. | 200 | | | | 200 | | | |
| Delta IV Increase | dl/g | 0.497 | | | | 0.485 | | | |
| Residence time at reaction temperature | Hrs | 32 | | | | 30 | | | |
| IV build up rate | units/hr | 0.0155 | | | | 0.0162 | | | |

Crystallization Kinetics Evaluation Using Avrami MacroKinetic Model

A conventional method for improving molding cycle time is to add nucleating agents to polymer formulations. As the polymer cools during the molding cycle, homogenous or spontaneous nucleation occurs which is related to the degree of super-cooling (difference between melting temperature and onset of crystallization), resulting in the growth of complex, 3 dimensional structures called spherulites. The spherulites have semi-crystalline structure where highly ordered lamellae plates are interrupted by amorphous regions. These structures continue to grow and eventually impinge on the growth of neighboring spherulites. The size of spherulites varies in the range of micrometers up to a centimeter. Size is controlled by key parameters such as cooling rates, polymer molecular structure, the number of nucleation sites. Incorporation of nucleating agents in polymer formulations provides additional surfaces where crystal growth can occur, resulting in a reduction in size of the spherulitic structures. This reduction in the size of spherulitic structures is often beneficial to molded parts. For example, size reduction will reduce the mold cooling time while at the same time enhancing the optical clarity, impact strength, as well as other properties.

Crystallization of polymers can be described as the sequence of two processes: primary and secondary crystallization 1. Primary crystallization consists of two mechanisms: primary nucleation and secondary nucleation or crystal growth. Secondary crystallization occurs in melted areas in the interstitial zones formed (spherulites, etc.) during the primary crystallization process. The most frequently used mathematical macrokinetic model to describe primary crystallization is the Avrami equation.

If the crystallinity at a time t and the maximum crystallinity possible at infinite time can be expressed as $\chi_t$ and $\chi_\infty$ respectively, then the fraction crystallized at any time X(t) can be written as Equation (1):

$$X(t) = \left(\frac{X_t}{X_\infty}\right)\left(\frac{X_t}{X_\infty}\right) \quad (1)$$

For the DSC experiment, this is simply the fractional area under the crystallization exotherm normalized to the entire exotherm area, as provided in Equation (2):

$$X_t = \frac{\int_o^t (dH/dt)dt}{\int_o^\infty (dH/dt)dt} = \frac{\Delta H_t}{\Delta H_\infty} \qquad (2)$$

where dH/dt is rate of heat evolution, ΔHt, the total heat evolved at time t; and ΔH∞, as the total heat evolved as time approaches infinity The Avrami equation is provided by Equation (3):

$$X(t) = 1 - \exp(-K_a t^n) \qquad (3)$$

where:
X(t)=fraction crystallized as a function of time
$k_a$=Avrami Rate Constant (function of nucleation and crystal growth rate)
n=Avrami Exponent (function of growth geometry)
t=time (seconds or minutes).

The linear form of the Avrami equation is provided by Equation (4):

$$\log(-\ln(1-X(t))) = \log k + n \log t \in [0.1, 0.85] \qquad (4)$$

A plot of the log (−ln(1−X(t)) versus log t is linear and yields the Avrami parameters ka (antilog of intercept and n slope). The crystallization half time ($t_{1/2}$) is expressed as Equation (5):

$$t_{1/2} = \left(\frac{\ln 2}{k}\right)^{1/n} \qquad (5)$$

The crystallization half time $t_{1/2}$ is defined as the time which the extent of crystallization is 50% complete.

Figure 1B:
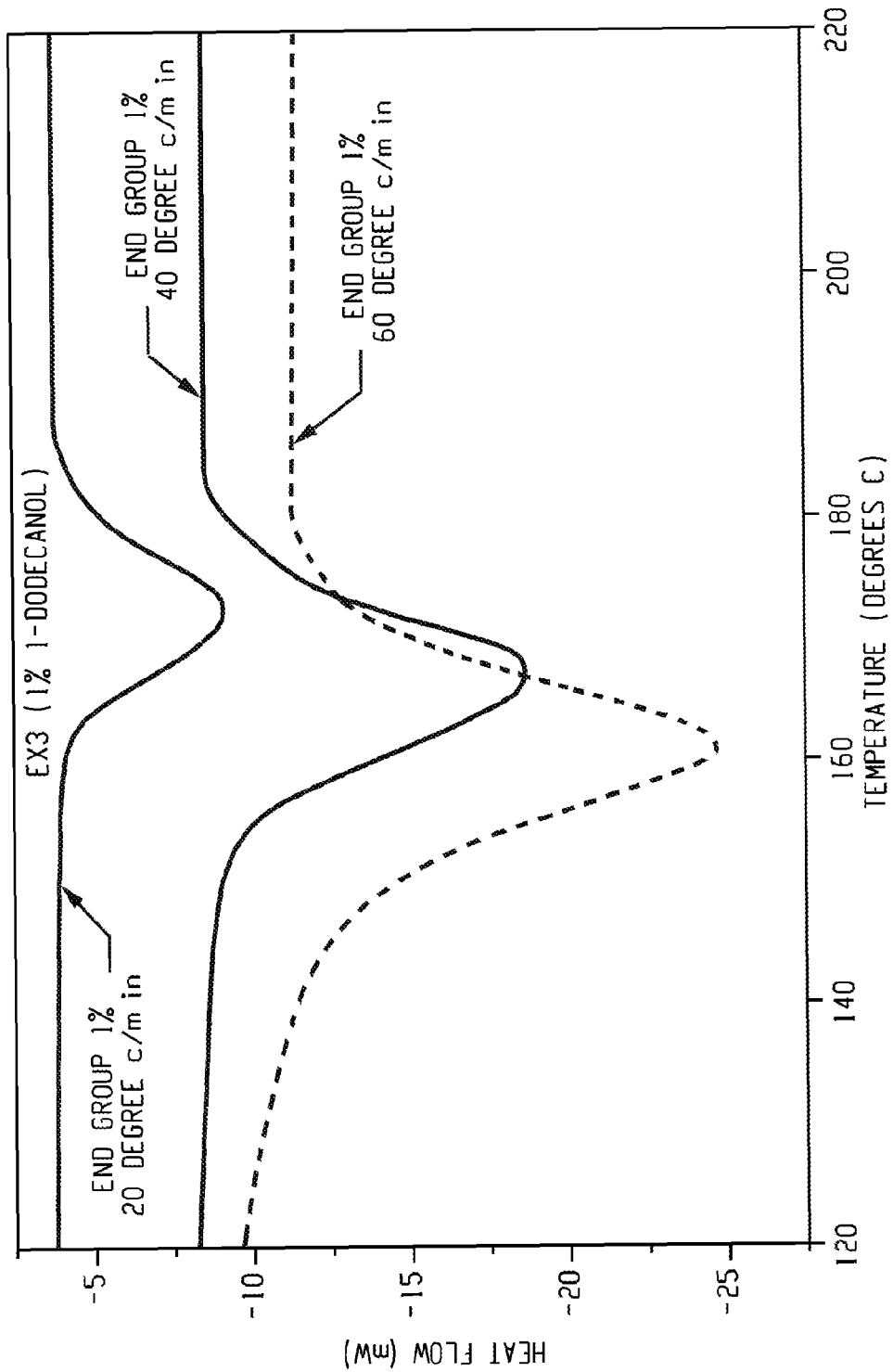

FIGS. 1A and 1B shows the crystallization curves of PE-I (Virgin PBT) and EX3 as a function of cooling rates (20, 40, 60° C./min). The crystalline temperatures ($T_c$) of the samples are summarized in Table 3. The thermograms of the new catalyst resins provided in FIG. 1 show a higher $T_c$ compared to virgin PBT. This increase in $T_c$ is independent of the cooling rate. For example, as provided in Table 3, at a given cooing rate of 20° C./min, an apparent exothermal peak at 165° C. is observed for virgin PBT whereas the incorporation of dodecanol as an end group shifts the $T_c$ to higher temperature (172° C. for EX3 carrying 1 mol % of dodecanol end-cap). The increase in $T_c$ suggests that end groups most likely act as heterogeneous nucleating agents which causes the polymer to crystallize (nucleation stage) at higher temperature.

TABLE 3

|  | Cooling Rate degree ° C./min | Tc [° C.] |
| --- | --- | --- |
| CEX1 | 20 | 170 |
|  | 40 | 163 |
|  | 60 | 157 |
| PE-I 315 (Virgin PBT) | 20 | 165 |
|  | 40 | 153 |
|  | 60 | 149 |
| EX3 | 20 | 172 |
|  | 40 | 166 |
|  | 60 | 156 |

Figure 2:
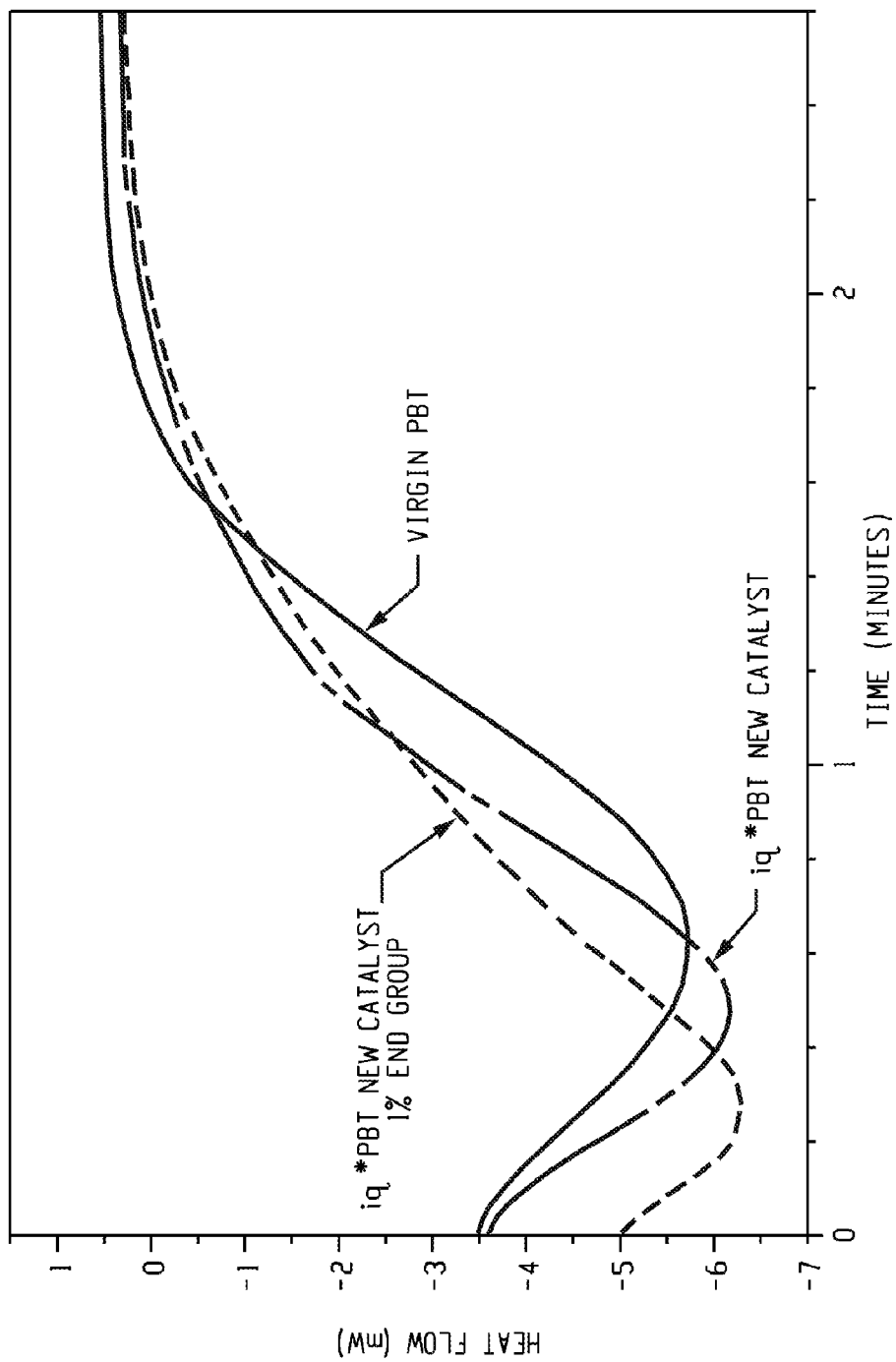
FIG. 2 depicts isothermal crystallization exotherms at 180° C. of PE-I, PE-II, and EX3.

The overlays of the crystallization exotherms for the CEX1, PE-I, and EX3 (PBT prepared from recycled PET as described herein with 1 mol % 1-dodecanol end-cap) are shown in FIG. 2. FIG. 2 clearly shows that CEX1 and EX3 crystallize at earlier that Virgin PBT.

Figure 3A:
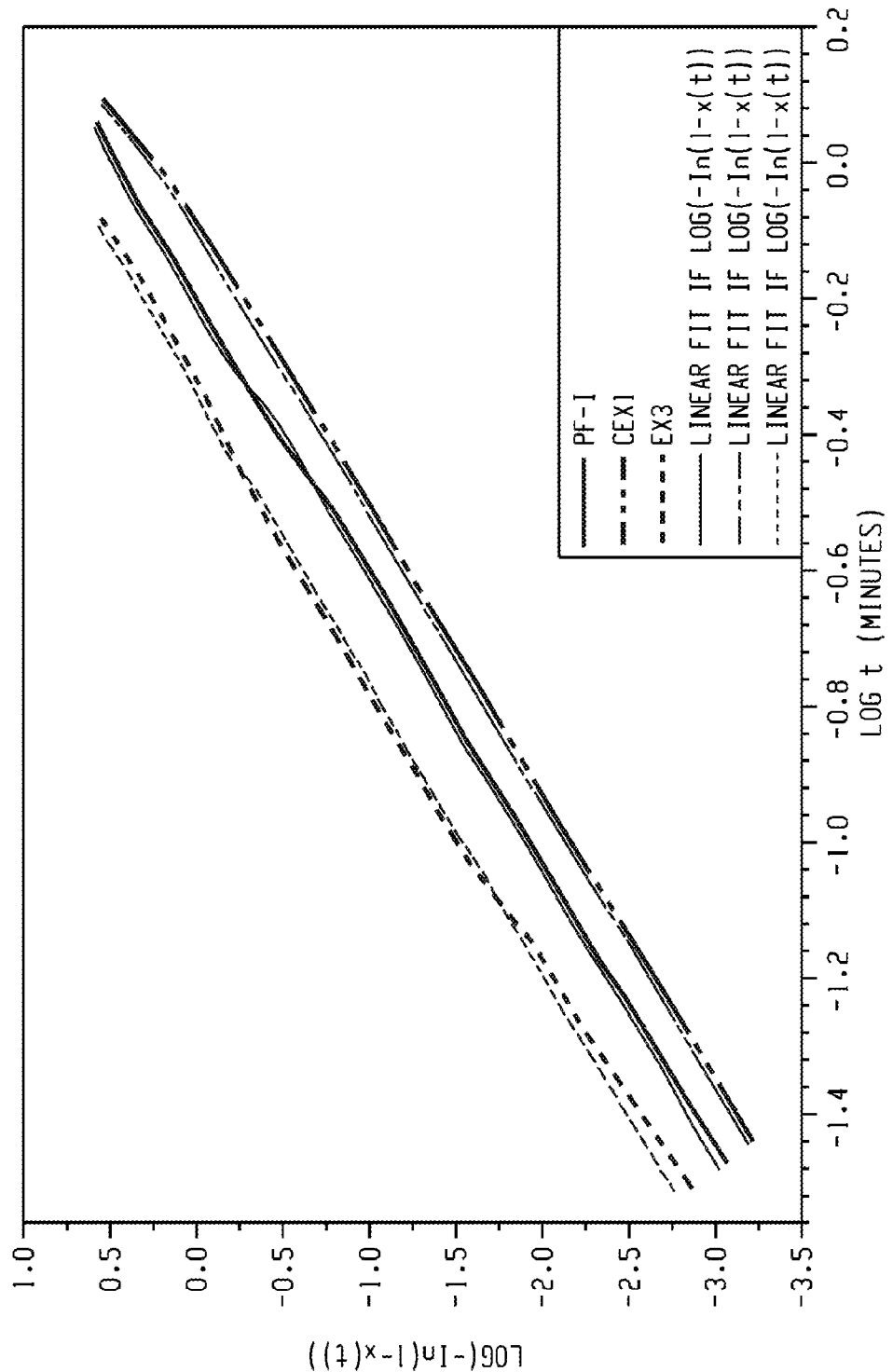
FIGS. 3A and 3B depicts plots of log(ln(1−X(t)) vs. log t at a cooling rate of 20° C./min for PE-I, CEX1, and EX3.
Figure 3B:
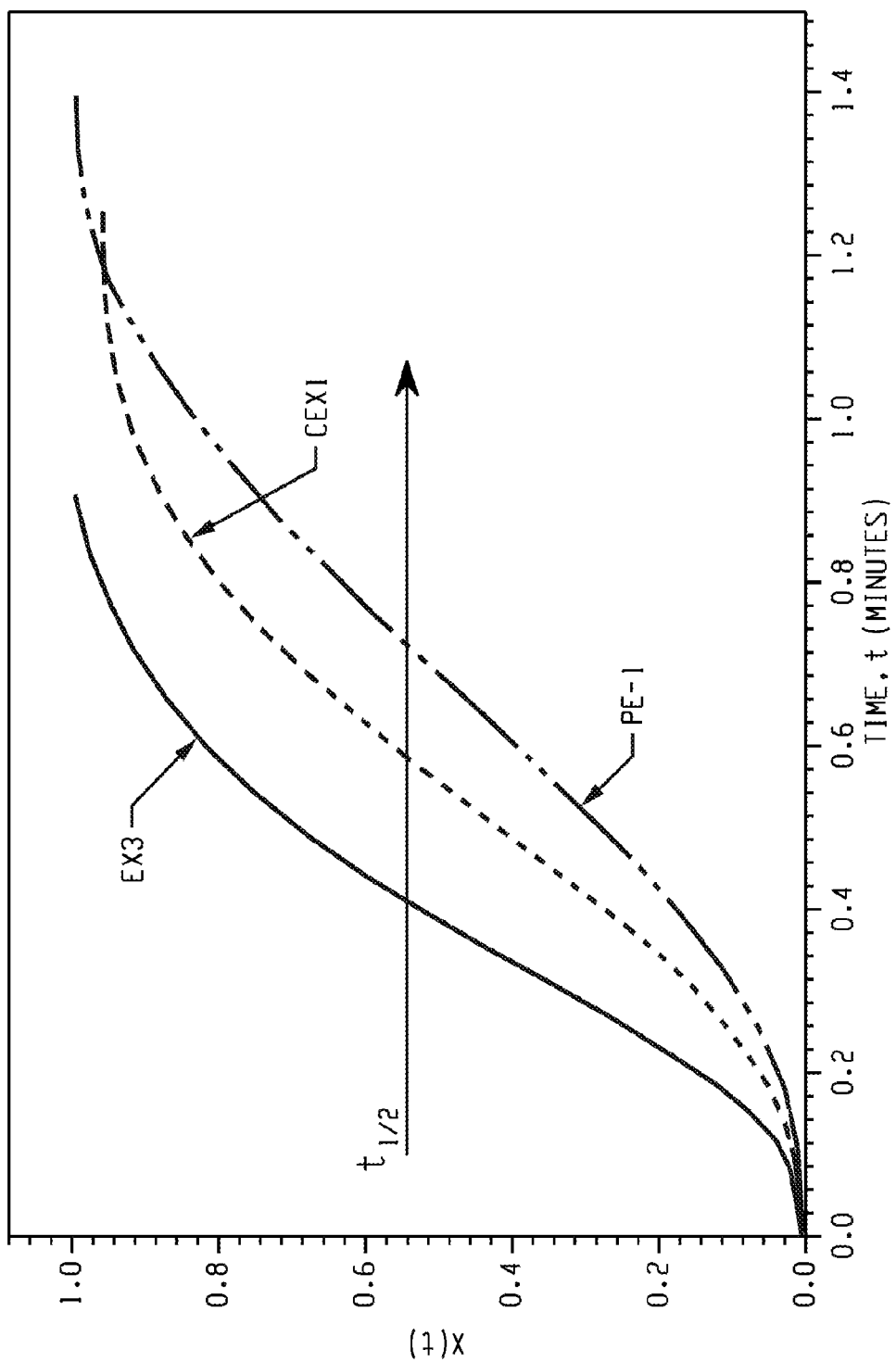

Table 4 and FIGS. 3A and 3B summarize the Avrami parameters obtained using Equation (6), the linearized form of the Avrami in the limits of X(t) E [0.1, 0.85] using Microsoft Excel.

$$\log(-\ln(1-X(t))) = \log k + n \log t \in [0.1, 0.85] \qquad (6)$$

TABLE 4

| Sample | Avrami Exponent (n) | Crystallization Rate Constant (k) [min$^{-n}$] | t$^{1/2}$ [min] |
| --- | --- | --- | --- |
| PE-I 315 (Virgin PBT) | 2.43 | 1.81 | 0.68 |
| CEX1 | 2.34 | 2.63 | 0.55 |
| EX3 | 2.34 | 6.02 | 0.38 |

From Table 4 and FIGS. 3A and 3B, it is very clear that there is a profound difference in the rate constant k and by implication crystallization half time $t_{1/2}$. Approximately there is a 50% reduction in half time for the EX3 material compared to virgin PBT. The Avrami exponent of approximately 2.5 suggests the nucleation geometry as spherical (spherulites). The most significant effect is the simultaneous reduction of $t_{1/2}$ and the reduction of the degree of undercooling needed for crystallization (nucleation). This is obviously the effect of the dodecanol end-cap, which leads a reduction of cycle time and lowering of energy costs needed for cooling.

Figure 4:
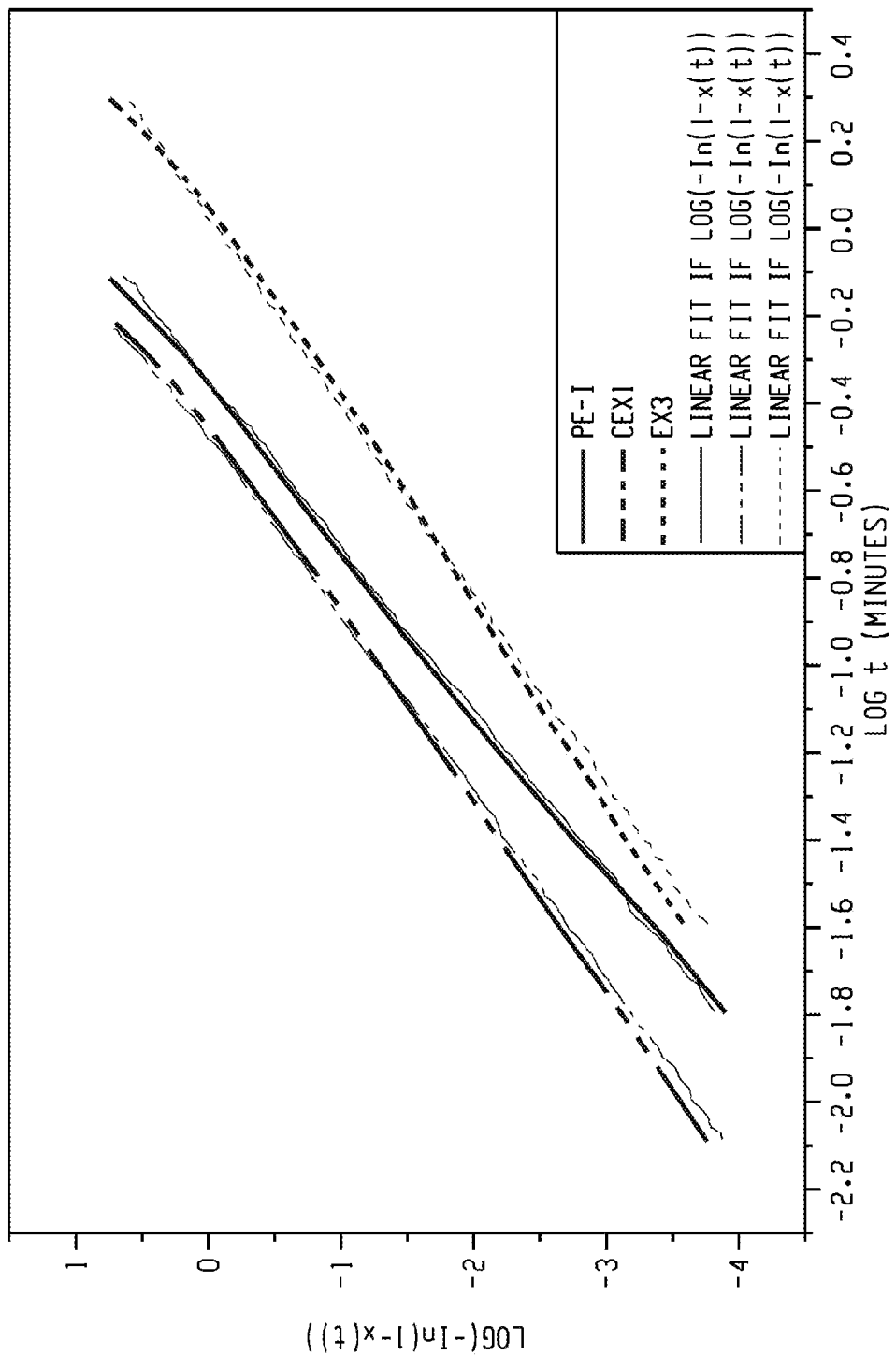
FIG. 4 depicts plots of log(ln(1−X(t)) vs. log t at a cooling rate of 60° C./min for PE-I, PE-II, and EX3.

FIG. 4 shows the overlays of the Avrami equations for Virgin PBT (PE-I), PE-II and EX3. The calculated Avrami parameters are tabulated in Table 5. The crystalline growth rate for EX3 is significantly higher than PE-II 315 at a given cooling rate of 60° C./min. Comparing the results from Tables 2 and 3, it is very clear that the virgin PBT and PE-II 315 crystallize at a relatively slower rate with higher crystallization time at 60° C./min compared to 20° C./min, whereas, in the case of EX3, there is a significant reduction in $t_{1/2}$ with improved crystallization rate. This clearly indicates that the presence of end group acts as a heterogeneous nucleating agent to improve the crystallization rate and reduce crystallization time (approximately 10 times) whereas the conventional PBT struggles to crystallize. Finally, the presence of the nucleating agent as an end group continues to improve the crystallization rate and crystallization time irrespective of the cooling rate.

TABLE 5

| Sample | Avrami Exponent, n | Crystallization rate Constant, K [min$^{-n}$] | t$_{1/2}$ [Mins] |
| --- | --- | --- | --- |
| PE-II 315 | 2.64 | 8.12 | 0.4 |
| EX3 | 2.36 | 11.48 | 0.3 |
| Virgin PBT (PE-I 315) | 2.3 | 0.87 | 0.9 |

Hydrostability of Modified Encapped PBT Composition

The hydrostability of a 30% glass filled impact modified endcapped PBT grade compared to the same PBT grade that was not endcapped (Table 6). In the PBT grade, 1.7% cycloaliphatic epoxy resin was added to enhance hydrostability. Ten samples were prepared using virgin PBT resin (PE-I 195), commercial PBT resin prepared from recycled PET (PET-II, 195) PBT resin prepared from recycled PET including various molar concentration of dodecanol end-cap (EX2, EX4, and EX6, Tables 2A and 2B)). The main purpose of this experiment was to understand the influence of carboxylic acid end group concentration on the hydrostability of Valox formulations. In addition, the necessity of epoxy chain extender at low carboxylic acid end group concentration was also investigated.

this type of epoxy chain extender is unreactive when it is used with resins carrying very low carboxylic acid end group concentrations. PE-I 195 (Virgin PBT) has a carbox-

TABLE 6

| Item Description | Unit | CEX3 PE-I 195 w Epoxy | CEX4 PE-I 195 w/o Epoxy | CEX5 PE-II 195 w Epoxy | CEX6 PE-II 195 w/o Epoxy | EX7 EX2 w Epoxy 0.5% Endcap | EX8 EX2 w/o Epoxy 0.5% Endcap | EX9 EX4 w Epoxy 1.0% Endcap | EX10 EX4 w/o Epoxy 1.0% Endcap | EX11 EX6 w Epoxy 2.0% Endcap | EX12 EX6 w/o Epoxy 2.0% Endcap |
|---|---|---|---|---|---|---|---|---|---|---|---|
| PE-I 195 | % | 63.21 | 64.91 | — | — | — | — | — | — | — | — |
| iQPBT PE-II 195 | % | — | — | 63.21 | 64.91 | — | — | — | — | — | — |
| EX2 0.5% Endcap | % | — | — | — | — | 63.21 | 64.91 | — | — | — | — |
| EX4 1% Endcap | % | — | — | — | — | — | — | 63.21 | 64.91 | — | — |
| EX6 2% Endcap | % | — | — | — | — | — | — | — | — | 63.21 | 64.91 |
| Sodium Stearate T1 | % | 0.05 | 0.05 | 0.05 | 0.05 | 0.05 | 0.05 | 0.05 | 0.05 | 0.05 | 0.05 |
| Hindered Phenol Stabilizer | % | 0.04 | 0.04 | 0.04 | 0.04 | 0.04 | 0.04 | 0.04 | 0.04 | 0.04 | 0.04 |
| Cyvloaliphatic Epoxy Resin | % | 1.7 | — | 1.7 | — | 1.7 | — | 1.7 | — | 1.7 | — |
| LLDPE | % | 5 | 5 | 5 | 5 | 5 | 5 | 5 | 5 | 5 | 5 |
| Standard 13 Micron PBT Glass | % | 30 | 30 | 30 | 30 | 30 | 30 | 30 | 30 | 30 | 30 |

Mechanical, rheological and thermal properties for the glass filled PBT grades are summarized in Table 7. It can be seen that all samples showed equivalent mechanical properties with the respect to flexural, impact (both room temperature and low temperature), and tensile properties. Samples prepared from virgin PBT showed higher HDT compared to samples prepared from PBT resins prepared from recycled PET. The reason for this is the incorporation of isophthalic and dietheylene glycol impurities in the resin backbone, which lead to low melting temperature.

ylic acid end group concentration that is greater than 40 mmol/kg. Thus, the carboxylic acid end groups in PE-I 195 effectively react with the epoxy chain extender, resulting in lower MVR. When a chain extender is not used for such formulations, higher carboxylic concentration catalyzes degradation reactions, leading to higher MVR.

The impact strength and tensile strength retention after hydro-aging under 110° C. and 100% relative humidity in a pressure cooker for the glass-filled blends is reported in Table 8. CEX3 (PE-I 195 with epoxy chain extender)

TABLE 7

| Test Description | Unit | CEX3 PE-I 195 w Epoxy | CEX4 PE-I 195 w/o Epoxy | CEX5 PE-II 195 w Epoxy | CEX6 PE-II 195 w/o Epoxy | EX7 EX2 w Epoxy 0.5% Endcap | EX8 EX2 w/o Epoxy 0.5% Endcap | EX9 EX4 w Epoxy 1.0% Endcap | EX10 EX4 w/o Epoxy 1.0% Endcap | EX11 EX6 w Epoxy 2.0% Endcap | EX12 EX6 w/o Epoxy 2.0% Endcap |
|---|---|---|---|---|---|---|---|---|---|---|---|
| Test Description Mechanical | Unit | | | | | | | | | | |
| Density | — | 1.52 | 1.51 | 1.51 | 1.51 | 1.51 | 1.51 | 1.51 | 1.51 | 1.51 | 1.51 |
| Specific Gravity | — | 1.52 | 1.52 | 1.51 | 1.51 | 1.51 | 1.51 | 1.51 | 1.51 | 1.51 | 1.51 |
| Flexural Modulus | MPa | 8650 | 8730 | 8690 | 8230 | 7900 | 7760 | 8240 | 8120 | 8050 | 7960 |
| Flexural Stress@Yield | MPa | 194 | 190 | 187 | 182 | 182 | 179 | 186 | 185 | 183 | 184 |
| Flexural Stress@Break | MPa | 193 | 190 | 187 | 182 | 181 | 177 | 186 | 185 | 183 | 183 |
| Notched Impact Ductility, 23C | % | 0 | 20 | 0 | 20 | 0 | 40 | 20 | 40 | 80 | 60 |
| Notched Impact Strength, 23C | J/m | 139 | 129 | 126 | 146 | 140 | 156 | 146 | 149 | 146 | 151 |
| Un-Notched Impact Ductility, 23C | % | 0 | 0 | 0 | 0 | 0 | 0 | 20 | 0 | 0 | 0 |
| Un-Notched Impact Strength, 23C | J/m | 895 | 875 | 834 | 849 | 816 | 814 | 818 | 867 | 845 | 895 |
| Modulus of Elasticity | MPa | 10132 | 9624 | 10098 | 9434 | 8940 | 9088 | 9402 | 9540 | 9298 | 9007.5 |
| Stress at Yield | MPa | 116 | 114 | 119 | 114 | 109 | 111 | 114 | 116 | 113 | 111 |
| Stress at Break | MPa | 116 | 114 | 116 | 112 | 107 | 109 | 113 | 114 | 111 | 108 |
| Elongation at Yield | % | 2.7 | 2.7 | 2.4 | 2.42 | 2.64 | 2.56 | 2.56 | 2.51 | 2.57 | 2.59 |
| Elongation at Break | % | 2.9 | 3 | 2.78 | 2.94 | 3.23 | 3.16 | 2.9 | 3.04 | 3.19 | 3.08 |
| Rheological | | | | | | | | | | | |
| MVR | cm³/10 min | 6.6 | 14.6 | 12.64 | 5.68 | 6.37 | 5.14 | 5.91 | 4.6 | 5.3 | 4.55 |
| Thermal | | | | | | | | | | | |
| Deflection temp | ° C. | 203 | 205 | 194.3 | 184.7 | 190.3 | 190.8 | 195.4 | 195.6 | 193.3 | 191.9 |

In MVR results, CEX4 showed higher flow than CEX3 where 1.7% epoxy was present. A big difference in MVR was not observed for formulations containing iQPBT resins with and without epoxy chain extender. This indicates that showed better hydrostability compared to CEX4 (PE-I 195 without epoxy chain extender), indicating that the epoxy chain extender improved the hydrostability by reacting with the carboxylic acid end group of the resin. However, the trend was completely and expectedly reversed for examples using PBT prepared from recycled PET. CEX5 (PE-II 195 with epoxy chain extender) showed lower hydrolytic stability compared to CEX6 (PE-II 195 without epoxy chain extender). The process described herein can supply iQPBT resin with a very low carboxylic acid end group concentration. This data clearly indicates that the reactivity of epoxy chain extender is directly proportional to the carboxylic acid end group concentration. In the case of CEX3, since the PE-I 195 carries a high carboxylic acid end group concentration, epoxy chain extender reactivity was efficient.

Figure 5:
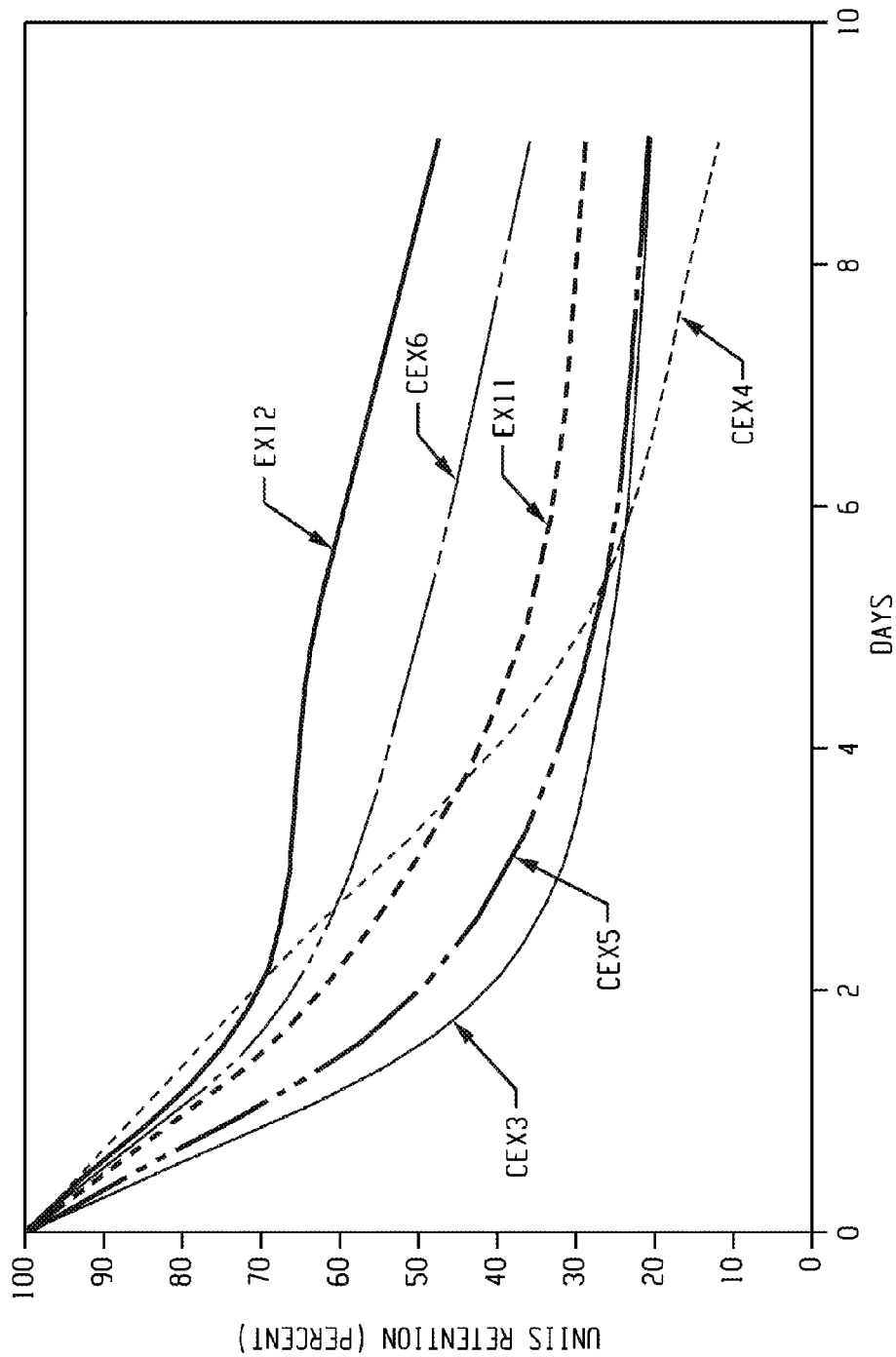
FIG. 5 depicts the impact strength retention as a function of hydroaging time for CEX3, CEX4, CEX5, CEX6, EX11, and EX12.
Figure 6:
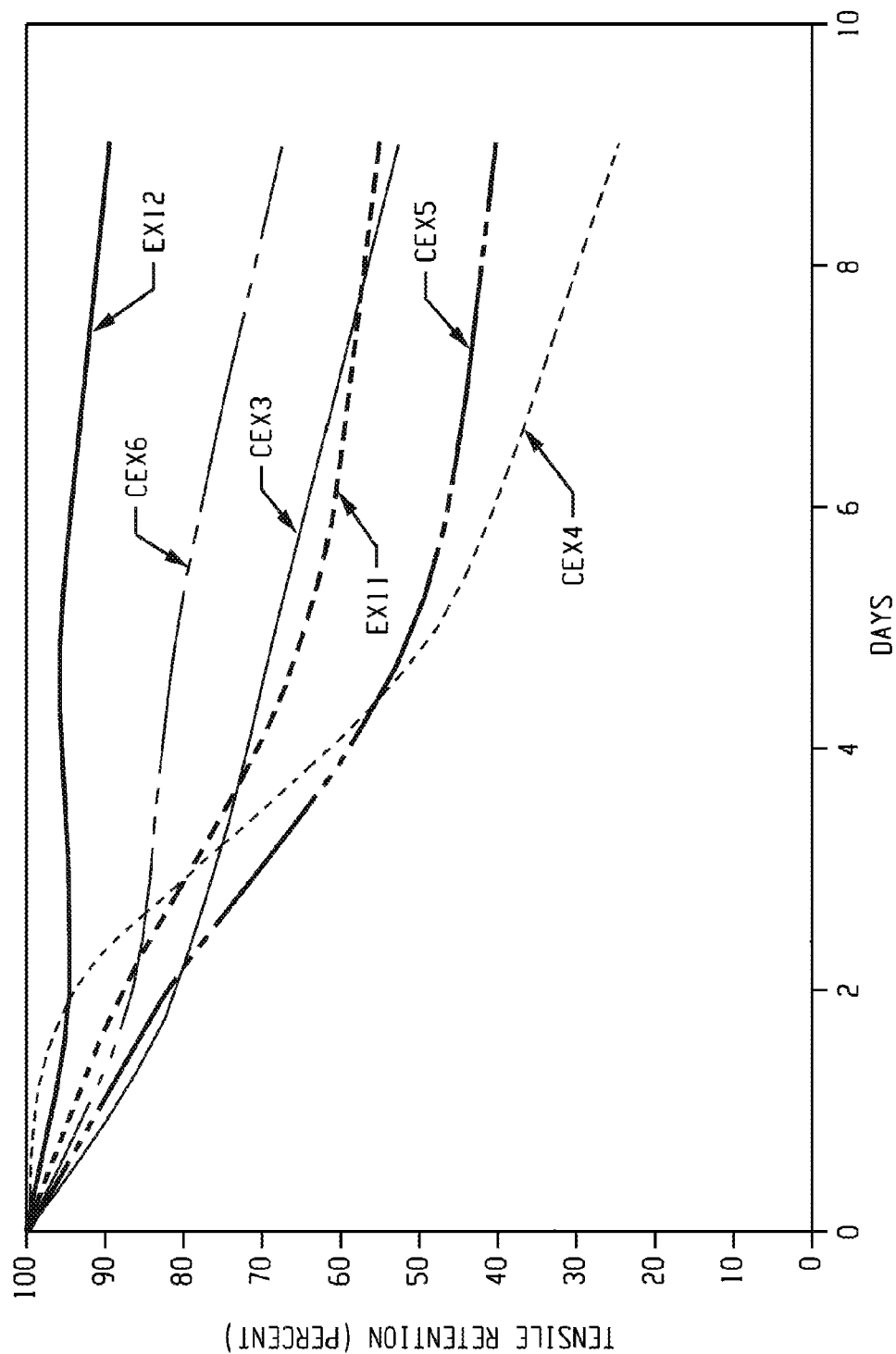
FIG. 6 depicts the tensile strength retention as a function of hydroaging time for CEX3, CEX4, CEX5, CEX6, EX11, and EX12.

One of the important aspects of the endcap technology is that it effectively reduces the carboxylic acid end group concentration. Table 8 clearly demonstrates that the carboxylix acid end group concentration decreased as the mol % feed of doecanol end-cap increased. Table 8, FIG. 5, and FIG. 6 indicate that EX12 (EX6, Tables 2A and 2B, prepared as described herein and containing 2% dodecanol but no epoxy) exhibited the best hydrostability, by having 47% unnotched impact strength retention and 90% tensile strength retention after 9 days of accelerated hydro-aging in a pressure cooker. In other words, EX12 (without epoxy chain extender) surprisingly showed 2.5 times better unnotched impact strength retention and close to 2 times better tensile strength retention compared to CEX3 through CXE6 formulations, particularly formulations having an epoxy chain extender. This result indicates that reduction of carboxylic acid end group concentration in the PBT will provide resin formulations with improved hydrostabilitiy because it is not necessary to use an epoxy chain extender.

TABLE 8

|  | | CEX3 PE-I 195 w Epoxy | CEX4 PE-I 195 w/o Epoxy | CEX5 PE-II 195 w Epoxy | CEX6 PE-II 195 w/o Epoxy | EX7 EX2 w Epoxy 0.5% Endcap | EX8 EX2 w/o Epoxy 0.5% Endcap | EX9 EX4 w Epoxy 1.0% Endcap | EX10 EX4 w/o Epoxy 1.0% Endcap | EX11 EX6 w Epoxy 2.0% Endcap | EX12 EX6 w/o Epoxy 2.0% Endcap |
|---|---|---|---|---|---|---|---|---|---|---|---|
| Un-notched impact Strength (J/m) | 0 Day | 895 | 875 | 834 | 849 | 816 | 814 | 818 | 867 | 845 | 895 |
|  | 2 Day | 370 | 621 | 415 | 557 | 528 | 617 | 542 | 645 | 525 | 629 |
|  | 5 Day | 227 | 252 | 228 | 421 | 330 | 518 | 398 | 610 | 306 | 564 |
|  | 9 Day | 187 | 102 | 175 | 302 | 251 | 190 | 266 | 267 | 239 | 424 |
| Tensile strength (MPa) | 0 Day | 116 | 114 | 116 | 112 | 107 | 109 | 113 | 114 | 111 | 108 |
|  | 2 Day | 94 | 107 | 95 | 97 | 96.7 | 101 | 99.9 | 104 | 97.2 | 102 |
|  | 5 Day | 79 | 55 | 58.9 | 90.6 | 75.3 | 99.5 | 82.3 | 102 | 71.4 | 103 |
|  | 9 Day | 61 | 28 | 46.6 | 75.6 | 63.9 | 66.4 | 64.5 | 87.3 | 61.2 | 96.6 |

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A thermoplastic composition with improved hydrostability and increased crystallization rate, comprising:
50 to 99.99 percent by weight of a modified endcapped polyalkylene terephthalate prepared from an alkylene diol, a dicarboxy compound, a catalyst complex, and an endcapping agent;
50 to 300 ppm of titanium as a tetra($C_1$-$C_8$ alkyl) titanate and 100 to 600 ppm of a phosphorus-containing compound, both based on the total weight of the modified endcapped polyalkylene terephthalate, wherein the phosphorus-containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and
0 to 60 percent by weight of a reinforcing filler,
wherein the modified endcapped polyalkylene terephthalate is prepared using 0.01 to 5 mole percent, based on the moles of the dicarboxy compound, of the endcapping agent which is a primary monoalcohol having 10 carbon atoms or more and a boiling point of at least 232° C. at atmospheric pressure,
wherein all weight percents are based on the total weight of the thermoplastic composition, and
wherein no catalyst quencher is added to the thermoplastic composition.

2. The thermoplastic composition of claim 1, wherein the modified endcapped polyalkylene terephthalate is a modified polybutylene terephthalate.

3. The thermoplastic composition of claim 1, wherein the modified endcapped polyalkylene terephthalate is prepared from recycled polyethylene terephthalate.

4. The thermoplastic composition of claim 1, wherein the tetra($C_1$-$C_8$ alkyl) titanate is tetraisopropyl titanate and the phosphorous containing compound is phosphoric acid.

5. The thermoplastic composition of claim 1, wherein the reinforcing filler is selected from glass fibers, carbon fibers, metal fibers, ceramic fibers or whiskers, such as wollastonite, polymeric fibers, alumina, amorphous silica, aluminosilicates, mica, clay, talc, glass flake, glass microspheres, metal oxides and ground quartz, and combinations thereof.

6. The thermoplastic composition of claim 5, wherein the reinforcing filler is glass fiber.

7. The thermoplastic composition of claim 6, comprising 25 to 35 percent by weight of the glass fiber.

8. The thermoplastic composition of claim 1, wherein the endcapping agent is selected from the group consisting of 1-decanol, 1-undecanol, 1-dodecanol, 1-tridecanol, 1-tetradecanol, 1-pentadecanol, 1 hexadecanol, 1-heptadecanol, 1-octadecanol, 1-nonadecanol, 1-eicosanol, 1-heneicosanol, 1-docosanol, 1-tetracosanol, 1-hexacosanol, 1-heptacosanol, 1-octacosanol, 1-nonacosanol, 1-triacontanol, 1-dotriacontanol, and 1-tetratriacontanol.

9. The thermoplastic composition of claim 8, wherein the endcapping agent is selected from the group consisting of 1-decanol, 1-undecanol, 1-dodecanol, and 1-tridecanol.

10. The thermoplastic composition of claim 1, further comprising 0.01 to 1 percent by weight of a stabilizer.

11. The thermoplastic composition of claim 10, comprising 0.03 to 0.07 percent by weight of the stabilizer which is pentaerythritol tetrakis(3,5-di-tert-butyl-4-hydroxyhydrocinnamate.

12. The thermoplastic composition of claim 1, further comprising 1 to 20 percent by weight of an impact modifier.

13. The thermoplastic composition of claim 12, comprising 2 to 8 percent by weight of the impact modifier which is linear low density polyethylene.

14. A thermoplastic composition, comprising:
    from 50 to 99.99 percent by weight of a modified endcapped polyalkylene terephthalate prepared from an alkylene diol, a dicarboxy compound, a catalyst complex, and an endcapping agent;
    50 to 300 ppm of titanium as a tetra($C_1$-$C_8$ alkyl) titanate and 100 to 600 ppm of a phosphorus-containing compound, both based on the total weight of the modified endcapped polyalkylene terephthalate, wherein the phosphorus-containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;
    from 0 to 60 percent by weight of a reinforcing filler which is glass;
    wherein the modified endcapped polyalkylene terephthalate is prepared using 0.01 to 3 mole percent, based on the moles of the dicarboxy compound, of the endcapping agent which is a primary or secondary alcohol having 10 carbon atoms or more and a boiling point of at least 232° C. at atmospheric pressure;
    from 0 to 30 percent by weight of an impact modifier; and
    from 0 to 5 percent by weight of an additive selected from a nucleating agent, antioxidant, UV stabilizer, plasticizer, epoxy compound, melt strength additive, or a combination thereof, crosslinkers, and combinations thereof,
    wherein all weight percents are based on the total weight of the thermoplastic composition, and
    wherein no catalyst quencher is added to the thermoplastic composition.

15. The thermoplastic composition of claim 14, comprising:
    from 50 to 99.99 percent by weight of the modified endcapped polyalkylene terephthalate;
    50 to 300 ppm of titanium as a tetra($C_1$-$C_8$ alkyl) titanate and 100 to 600 ppm of a phosphorus-containing compound, both based on the total weight of the modified endcapped polyalkylene terephthalate, wherein the phosphorus-containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and
    from 0 to 60 percent by weight of the reinforcing filler which is glass,
    wherein the modified endcapped polyalkylene terephthalate is prepared using 0.01 to 2.5 mole percent, based on the moles of the dicarboxy compound, of the endcapping agent which is the primary alcohol having 10 carbon atoms or more and a boiling point of at least 232° C. at atmospheric pressure;
    and further comprising from 0 to 1 percent by weight of a stabilizer;
    from 0 to 10 percent by weight of the impact modifier; and
    from 0 to 5 percent by weight of a chain extender.

16. The thermoplastic composition of claim 15, comprising:
    from 50 to 99.99 percent by weight of the modified endcapped polyalkylene terephthalate,
    100 to 300 ppm of titanium as tetraisopropyl titanate and 30 to 100 ppm of phosphoric acid, both based on the total weight of the modified endcapped polybutylene terephthalate;
    from 1 to 60 percent by weight of the reinforcing filler which is glass,
    wherein the modified endcapped polyalkylene terephthalate is prepared using 0.01 to 2.5 mole percent, based on the moles of the dicarboxy compound, of the endcapping agent which is the primary alcohol selected from the group consisting of 1-decanol, 1-undecanol, 1-dodecanol, and 1-tridecanol;
    from 0.01 to 1 percent by weight of the stabilizer;
    from 1 to 10 percent by weight of the impact modifier; and
    from 1 to 5 percent by weight of the chain extender.

17. The thermoplastic composition of claim 16, comprising:
    from 5 to 50 percent by weight of the reinforcing filler which is glass;
    from 0.02 to 0.08 percent by weight of the stabilizer; and
    from 1 to 4 percent by weight of the chain extender.

18. The thermoplastic composition of claim 14, comprising:
    from 50 to 99.99 percent by weight of the modified endcapped polybutylene terephthalate;
    50 to 300 ppm of titanium as tetraisopropyl titanate and 100 to 600 ppm of phosphoric acid, both based on the total weight of the modified endcapped polybutylene terephthalate;
    from 25 to 35 percent by weight of the reinforcing filler which is glass;
    wherein the endcapping agent which is 1-dodecanol;
    and further comprising from 0.03 to 0.07 percent by weight of a stabilizer;
    from 2 to 8 percent by weight of the impact modifier; and
    from 1.5 to 3 percent by weight of a chain extender.

19. The thermoplastic composition of claim 18, wherein the chain extender which is 3,4-epoxycyclohexylmethyl-3',4'-epoxycyclohexane carboxylate.

* * * * *